United States Patent
Moens et al.

(10) Patent No.: US 9,310,542 B2
(45) Date of Patent: Apr. 12, 2016

(54) GLASS SUBSTRATE WITH INTERFERENCE COLOURATION FOR A FACING PANEL

(75) Inventors: Vincent Moens, Jumet (BE); Stijn Mahieu, Jumet (BE)

(73) Assignee: AGC Glass Europe, Brussels (BE)

( * ) Notice: Subject to any disclaimer, the term of this patent is extended or adjusted under 35 U.S.C. 154(b) by 535 days.

(21) Appl. No.: 13/811,534

(22) PCT Filed: Jul. 29, 2011

(86) PCT No.: PCT/EP2011/063135
§ 371 (c)(1),
(2), (4) Date: Jan. 22, 2013

(87) PCT Pub. No.: WO2012/013796
PCT Pub. Date: Feb. 2, 2012

(65) Prior Publication Data
US 2013/0120842 A1    May 16, 2013

(30) Foreign Application Priority Data

Jul. 29, 2010 (BE) .................................... 2010/470
May 6, 2011 (EP) .................................... 11165048
May 6, 2011 (EP) .................................... 11165073
May 6, 2011 (EP) .................................... 11165107

(51) Int. Cl.
*G02B 1/10* (2015.01)
*G02B 5/28* (2006.01)
*C03C 17/36* (2006.01)

(52) U.S. Cl.
CPC ............... *G02B 5/285* (2013.01); *C03C 17/36* (2013.01); *C03C 17/3613* (2013.01);
(Continued)

(58) Field of Classification Search
CPC .............. G02B 1/00; G02B 1/08; G02B 1/10; G02B 1/105; G02B 5/208; G02B 5/28; G02B 5/281; G02B 5/285; G02B 5/286
USPC ................. 359/350, 359–360, 577, 580, 582, 359/584–590, 885; 427/457, 488
See application file for complete search history.

(56) References Cited

U.S. PATENT DOCUMENTS 4,902,581 A    2/1990 Criss
5,337,191 A    8/1994 Austin
(Continued)

FOREIGN PATENT DOCUMENTS

FR    2 679 578    1/1993
JP    62-138345    6/1987
(Continued)

OTHER PUBLICATIONS

International Search Report Issued Apr. 5, 2012 in PCT/EP11/63135 Filed Jul. 29, 2011.
(Continued)

*Primary Examiner* — Ricky Mack
*Assistant Examiner* — Robert E Tallman
(74) *Attorney, Agent, or Firm* — Oblon, McClelland, Maier & Neustadt, L.L.P.

(57) ABSTRACT

The invention relates to a glass substrate with interference coloration for a facing panel, comprising a glass sheet covered on one of the faces thereof by a stack of coatings including successively at least: a first transparent coating made from a dielectric material having an optical thickness at least greater than or equal to 5 nm and at most less than or equal to 258 nm; a semi-transparent functional coating having a geometric thickness at least greater than or equal to 0.1 nm and at most less than or equal to 50 nm; a second transparent coating made from a dielectric material and having an optical thickness at least greater than or equal to 20 nm and at most less than or equal to 300 nm; and a coating providing opacity or quasi-opacity and having a geometric thickness at least greater than or equal to 30 nm.

20 Claims, 2 Drawing Sheets

Figure 1:
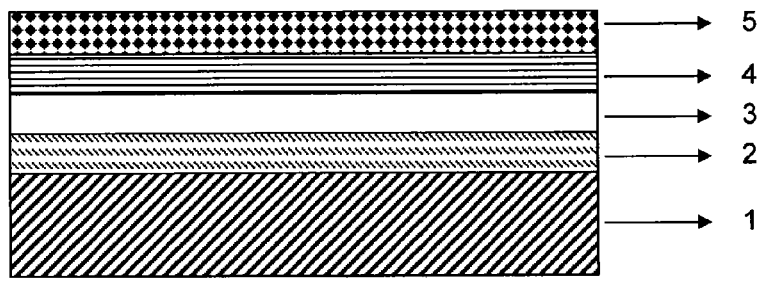

(52) U.S. Cl.
CPC ........ *C03C 17/3626* (2013.01); *C03C 17/3634* (2013.01); *C03C 17/3639* (2013.01); *C03C 17/3644* (2013.01); *C03C 17/3649* (2013.01); *C03C 17/3657* (2013.01); *C03C 17/3681* (2013.01); *C03C 17/3684* (2013.01); *C03C 2217/72* (2013.01)

(56) References Cited

U.S. PATENT DOCUMENTS

| | | | |
|---|---|---|---|
| 6,159,607 A | 12/2000 | Hartig et al. | |
| 6,650,478 B1 * | 11/2003 | DeBusk et al. | ............... 359/585 |
| 6,955,833 B1 | 10/2005 | Gallego | |
| 7,153,579 B2 * | 12/2006 | Kriltz et al. | ................... 428/432 |
| 2005/0238886 A1 | 10/2005 | Gallego | |
| 2007/0082219 A1 | 4/2007 | Fleury et al. | |

FOREIGN PATENT DOCUMENTS

| | | |
|---|---|---|
| JP | 2007-512218 | 5/2007 |
| JP | 2010-159171 | 7/2010 |

OTHER PUBLICATIONS

English Translation of Office Action Mailed Dec. 19, 2014 (5 pages).

* cited by examiner

GLASS SUBSTRATE WITH INTERFERENCE COLOURATION FOR A FACING PANEL

1. FIELD OF THE INVENTION

The present invention relates to the technical field of glass substrates with interference coloration.

More precisely, the invention relates to a glass substrate with interference coloration for a facing panel and to its method of manufacture and its use.

The glass substrate with interference coloration for a facing panel referred to in the present invention can be used more particularly as a glass substrate for a facade facing panel, also called spandrel. The spandrel according to the present invention occurs more particularly in the form of a monolithic spandrel made from a single sheet. It may alternatively be used as a decorative facing panel, or as a reflecting decorative panel for indoor or outdoor applications such as shelf, cabinet, door, ceiling, support, glass table, bracket, partition, storefront elements, etc.

2. SOLUTIONS IN THE PRIOR ART

A glass substrate with interference coloration for a facing panel generally consists of a sheet of glass upon which a stack of coatings is deposited, among which at least three types of different coating can be distinguished:
- functional coatings mainly contributing to the optical properties of the stack,
- protective coatings, generally made from transparent dielectric materials, whose role, apart from supplying chemical and/or mechanical protection of the functional coatings, is to allow the construction of optical cavities,
- at least one enamel or paint coating providing the opacity or quasi-opacity of the stack of coatings, the enamel or paint coating being deposited, with regard to the glass sheet, on the top of the stack of coatings.

The colorimetric contribution of the enamel or paint coating providing the opacity or quasi-opacity of the stack of coatings is mainly due to its chemical composition. The expression "interference coloration" means a coloration obtained fully or mainly by the reflection and refraction of the incident light on the various thin coatings constituting the stack of coatings. The expression "colorimetric contribution" means the contribution to the color of the glass substrate perceived by an observer. The expression "opacity or quasi-opacity of said stack" means that the light transmittance is at most 4%, preferably at most 2%, more preferably at most 1.0%, the most preferably at most 0.1%, when said stack is applied to a clear silica soda lime float glass 4 mm thick, measured with a source corresponding to the CIE standard D65 "daylight" illuminant and at a solid angle of 2°, according to standard EN410.

The glass substrate with interference coloration for a facing panel can be used more particularly as a glass substrate for a facade facing panel, also called spandrel, the spandrel occurring more particularly in the form of a monolithic spandrel made from a single sheet.

A fully glazed facade in fact corresponds to two zones, a viewing zone corresponding to the window locations and an opaque zone corresponding typically to the facade facing panels, also called spandrels. The facade facing panels consist in fact of glass sheets which are opaque or quasi-opaque. The opacity or quasi-opacity of the glass sheet is provided by an enamel or paint coating. Facade facing panels, due to their opacity or their quasi-opacity, are generally used to fully or partially conceal or mask the unattractive portions of a structure or of a building. For example, facade facing panels can be used to conceal from the view floor slabs, the equipment of airconditioned installations, heating ducts, etc.

The facade facing panels are installed, for reasons of cost and size, directly on the structure or the building to be covered. Such an installation aggravates problems of corrosion of the stack of coatings of the glass substrate with interference coloration constituting the facade facing panel. The stack of coatings of the glass substrate with interference coloration constituting the facade facing panel is therefore required to provide durability. This requirement of durability is both a physicochemical requirement associated with the toughening and with an invulnerability to chemical and atmospheric agents (for example, corrosion resistance), and a mechanical requirement, associated with the resistance to scratching, for example during storage, handling or installation of the facade facing panels.

Furthermore, in the building field, it is desirable, or even necessary, for safety reasons, to use toughened glass sheets for producing glass substrates with interference coloration for a facade facing panel. The toughening process consists in heating the glass to a high temperature, above 600° C., followed by a rapid temperature drop in order to create mechanical stresses in the glass. Preferably, for reasons of industrial viability, the glass sheet constituting the glass substrate with interference coloration for a facade facing panel is not toughened prior to the fabrication of said substrate, but directly thereon. All of the materials constituting the glass substrate with interference coloration constituting the facade facing panel must therefore withstand this toughening process. Moreover, it is sometimes desirable for the glass substrate with interference coloration constituting the facade facing panel to be subjected to curving treatment in order to impart a curvature to said substrate, and it is therefore essential for the glass substrate with interference coloration for a facade facing panel to withstand such a treatment without any deterioration in its properties.

Finally, a problem raised by the concomitant use of windows and facade facing panels on a structure or a building is associated with the visual harmony of the window-facade facing panel combination when the building or the structure is seen from the exterior. This problem is exacerbated when the facade is completely glazed. In fact, for aesthetic reasons, it is desirable for the viewing zones, corresponding to the windows, and the opaque zones corresponding to the positions of the facade facing panels, situated between the viewing zones, to have the same appearance, that is to say, the same color for the same observation angle of between 0° and 60°, preferably for the same observation angle of between 0° and 55°.

These problems may arise for decorative facing panels for indoor or outdoor applications. Thus, they may also demand durability of the stack of coatings (for example with regard to the adhesives used to bond the panels or scratch resistance); for certain applications, they must also be able to withstand toughening (for example for shelves); and they also must be able to display a visual harmony (for example, in a store, a shelf, a table and a panel bonded to the wall must be able to display the same appearance, the same color, regardless of the observation angle).

Two alternatives for making such glass substrates with interference coloration for facing panels have been proposed previously. In patent application WO2007/008868 A2, a glass substrate is disclosed comprising a glass sheet covered in succession with a titanium dioxide coating, a silicon nitride coating, the whole being covered by an opaque colored coating, said opaque colored coating being obtained by the application of an enamel or a paint. The absence of a titanium based metallic functional coating inserted between the titanium dioxide and the silicon nitride serves to remedy the problem associated with the degradation of this functional coating during the toughening heat treatment. However, such glass substrates impose the limitation of using an opacifying enamel or paint coating. The use of enamels or paints deposited directly on the stack of coatings may raise a number of problems such as:

- problems of compatibility such as chemical reactions between the components of the enamel or of the paint and the coatings constituting the stack,
- the use of an additional step of enameling or the application of a paint directly to the stack of coatings increases the risk of scratching of said stack of coatings,
- the use of an enamel raises the problem of a baking of this enamel, this particularly vulnerable step may raise problems of porosity of the enamel coating which can cause delamination thereof, or even a problem of reproducibility of the colors obtained during the final production of the glass substrate for a facade facing panel or spandrel,
- the enamel or paint used as opacifying coating makes an important contribution to the color perceived, this contribution being such that it considerably reduces the number of structures of stacks of functional coatings and protective coatings capable of yielding the desired color,
- the choice of enamel serving to obtain a desired color is limited.

3. OBJECTIVES OF THE INVENTION

It is an object of the invention in particular to overcome the drawbacks of the prior art.

More precisely, one objective of the invention, in at least one embodiment, is to provide a glass substrate with interference coloration for a facing panel, having good physico-chemical and mechanical behavior. More specifically, the aim is to provide a facing panel compatible with monolithic use and suitable for exposure in an external environment.

One objective of the invention, in at least one of its embodiments, is to provide a glass substrate with interference coloration, said substrate preferably being monolithic, for a facing panel which is in particular "toughenable".

The invention, in at least one of its embodiments, has a further objective of providing a glass substrate with interference coloration, said substrate preferably being monolithic, for a facade facing panel capable of agreeing visually with a laminated glazing constituting the portion corresponding to the windows in a facade for the same observation angle of between 0° and 60°, more particularly for the same observation angle of between 0° and 55°, said facing panel not requiring the use of an enamel or of a paint.

4. SUMMARY OF THE INVENTION

In accordance with a particular embodiment, the invention relates to a glass substrate with interference coloration for a facing panel.

According to the invention, such a glass substrate with interference coloration for a facing panel comprises, consists, essentially consists of a glass sheet, preferably a single glass sheet, covered on one of its faces by a stack of coatings such that the stack of coatings comprises, in succession from the glass sheet, at least:

- a first transparent coating made from dielectric material, the optical thickness of the first transparent coating being at least 5.0 nm or more, preferably at least 10.0 nm or more, more preferably at least 20.0 nm or more, the most preferably at least 50.0 nm or more, preferably at least 70.0 nm or more, more preferably at least 100.0 nm or more, more preferably at least 110.0 nm or more and at most 258.0 nm or less, preferably at most 190.0 nm or less, more preferably at most 180.0 nm or less, the most preferably at most 150.0 nm or less, preferably at most 120.0 nm or less. Preferably, the optical thickness falls within the range of values from 5.0 nm, preferably from 10.0 nm, more preferably from 20.0 nm to 258.0 nm, preferably from 50.0 nm to 190.0 nm, more preferably from 70.0 nm to 180.0 nm, the most preferably from 100.0 nm to 150.0 nm, preferably from 110.0 to 120.0 nm,
- a semi-transparent functional coating, the geometric thickness of the semi-transparent functional coating being at least 0.1 nm or more, preferably at least 0.3 nm or more, more preferably at least 0.5 nm or more and at most 50.0 nm or less, preferably at most 25.0 nm or less, preferably the geometric thickness falls within the range of values from 0.1 nm, preferably 0.3 nm, to 50.0 nm, preferably from 0.5 nm to 25.0 nm, preferably said semi-transparent functional coating has an absorbance of between 10% and 70%,
- a second transparent coating made from a dielectric material, the optical thickness of the second transparent coating being at least 20.0 nm or more, preferably at least 30.0 nm or more, more preferably at least 100.0 nm or more, the most preferably at least 150.0 nm or more, preferably 170.0 nm or more and at most 300.0 nm or less, preferably at most 250.0 nm or less, more preferably at most 210.0 nm or less, the most preferably at most 200.0 nm or less, preferably the optical thickness falls within the range of values from 20.0 nm, preferably from 30.0 nm, more preferably from 100.0 nm to 300.0 nm, more preferably from 150.0 nm to 250.0 nm, the most preferably from 170.0 nm to 200.0 nm,
- a coating providing the opacity or the quasi-opacity of said stack, the geometric thickness of said coating providing the opacity or quasi-opacity being at least 30.0 nm or more, preferably at least 50.0 nm or more, more preferably at least 100.0 nm or more, the geometric thickness of the coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm, said coating providing the opacity or quasi-opacity comprising at least one metal, one metalloid, one nitride or one carbide.

The optical thickness of a coating is obtained by multiplying the geometric thickness of said coating by the refractive index of the material constituting said coating. The value of the refractive index considered is the value of said index at a wavelength of 550 nm.

The general principle of the invention is based on the one hand on the substitution of the enamel- or paint-based coating by an opaque or quasi-opaque coating having a geometric thickness of at least 30.0 nm or more, and on the other hand, the formation of optical cavity formed from the glass sheet of at least a first transparent dielectric coating, of a semi-transparent functional coating, of a second transparent dielectric coating and of a coating providing the opacity or the quasi-opacity of said stack and serving to obtain a desired coloration. The substitution of the enamel- or paint-based coating by a coating providing the opacity or quasi-opacity of the stack requires an adjustment of the optical cavity in terms of thickness of its various constituent coatings. The coloration of the interference substrate results from the optical cavity formed from at least one first transparent dielectric coating, from a semi-transparent functional coating, from a second transparent dielectric coating, and from a coating providing the opacity or quasi-opacity of said stack. The coloration is associated with the thicknesses and the compositions of the first transparent dielectric coating, the semi-transparent functional coating, the second transparent dielectric coating and the coating providing the opacity or quasi-opacity of the stack.

Thus, the invention is based on a completely novel and inventive approach. The inventors have in fact determined surprisingly that the substitution of the opacifying enamel- or paint-based coating by an opaque or quasi-opaque coating having a geometric thickness of 30.0 nm or more serves to simplify the fabrication of the glass substrates with interference coloration for a facing panel, said substrate preferably being monolithic, while avoiding the use of an application of paint or enamel and the problems associated with this step. The invention serves in effect to avoid:
- problems of compatibility such as chemical reactions between the components of the enamel or of the paint and the coatings constituting the stack of coatings,
- the use of an additional step of enameling or the application of a paint directly to the stack of coatings increases the risk of scratching of said stack,
- the use of an enamel raises problems:
  - of the baking of this enamel, this particularly vulnerable step may raise problems of porosity of the enamel coating which can cause delamination thereof,
  - the enamel or paint used as opacifying coating makes an important contribution to the color perceived, this contribution is such that it considerably reduces the number of structures of stacks of functional coatings and protective coatings capable of yielding the desired color. Furthermore, the choice of enamel serving to obtain a desired color is limited.

The geometric thickness of the coating providing the opacity or quasi-opacity is advantageously 100.0 nm or more, the inventors having determined that such a thickness, in addition to guaranteeing the opacity or quasi-opacity of the facing panel, serves to obtain a greater invulnerability to chemical and atmospheric agents (for example corrosion resistance). The geometric thickness of the coating providing the opacity or quasi-opacity advantageously falls within the range of values from 100.0 nm to 200.0 nm, such a thickness serving to obtain good invulnerability to chemical and atmospheric agents while serving to obtain the shortest possible times of deposition of said coating.

The expression "transparent coating" means a coating transparent to the wavelengths of visible light. The term "transparent" means that the light transmittance is at least 50% when the coating is applied to a sheet of clear silica soda lime float glass having a geometric thickness of 4 mm, measured with a source corresponding to the CIE standard D65 "daylight" illuminant and at a solid angle of 2°, according to standard EN410.

The expression "semi-transparent functional coating" means a functional coating semi-transparent to the wavelengths of visible light. The term semi-transparent means that the light absorbance falls within the range of values from 10% to 70% when the coating is applied to a sheet of clear silica soda lime float glass having a geometric thickness of 4 mm, measured with a source corresponding to the CIE standard D65 "daylight" illuminant and at a solid angle of 2°, according to standard EN410.

The material constituting at least one layer of the first transparent dielectric coating comprises at least one oxide or one nitride or one oxynitride. The oxide is selected from silicon, aluminum, titanium, zirconium, yttrium, hafnium, niobium, tin, tantalum, zinc oxides and mixed oxides of at least two of these elements, preferably from silicon, aluminum, titanium oxides and mixed oxides of at least two of these elements, the preferred oxide being silicon dioxide. The advantage resulting from the use of silicon dioxide is that it serves to obtain a good protective barrier for the semi-transparent functional coating during the toughening treatment and accordingly serves to obtain a facing panel with interference coloration having better toughening behavior. The nitride is selected from silicon, aluminum nitrides and mixed aluminum and silicon nitrides, the preferred nitride being silicon nitride. The advantage resulting from the use of silicon nitride is that it serves to obtain a good protective barrier of the semi-transparent functional coating during the toughening treatment and accordingly serves to obtain a facing panel with interference coloration having better toughening behavior. The oxynitride is selected from silicon oxynitride, aluminum oxynitride and mixed silicon and aluminum oxynitrides, the preferred oxynitride being silicon oxynitride. The advantage resulting from the use of silicon oxynitride is that it serves to obtain a good protective barrier of the semi-transparent functional coating during the toughening treatment and accordingly serves to obtain a facing panel with interference coloration having better toughening behavior. The first transparent dielectric coating may also contain a very small quantity, generally less than 10% in atomic percentage, of the additional components. They are in particular doping elements whose main role is to improve the fabrication and/or use of the cathodes in the production of layers in vacuum deposition techniques. These elements are conventionally intended in particular to improve the conductivity of the materials constituting the cathodes. Such doping elements are for example titanium, aluminum.

The material constituting at least one layer of the semi-transparent functional coating is a metal selected from titanium, tungsten, niobium, chromium, nickel, copper, tantalum, zirconium, yttrium, palladium, iron, alloys or mixtures of at least two of these metals, stainless steels. Preferably, the material constituting at least one layer of the semi-transparent functional coating is a metal selected from titanium, chromium, nickel, tantalum, tungsten, zirconium, yttrium, palladium, alloys of at least two of these metals, stainless steels, the advantage resulting from the use of these metals resulting from the fact that, owing to their physical properties such as thermal expansion, they serve to obtain a facing panel with interference coloration that has better toughening behavior. Stainless steels are preferred because in addition to their chemical and thermal expansion properties, they have good corrosion resistance.

The material constituting at least one layer of the second transparent dielectric coating comprises at least one oxide or one nitride or one oxynitride. The oxide is selected from silicon, aluminum, titanium, zirconium, yttrium, hafnium, niobium, tin, tantalum, zinc oxides and mixed oxides of at least two of these elements, preferably from silicon, aluminum, titanium oxides and mixed oxides of at least two of these elements, the preferred oxide being silicon dioxide. The advantage resulting from the use of silicon dioxide is that it serves to obtain a good protective barrier for the semi-transparent functional coating during the toughening treatment and accordingly serves to obtain a facing panel with interference coloration having better toughening behavior. The oxynitride is selected from silicon oxynitride, aluminum oxynitride and mixed silicon and aluminum oxynitrides, the preferred oxynitride being silicon oxynitride. The advantage resulting from the use of silicon oxynitride is that it serves to obtain a good protective barrier of the semi-transparent functional coating during the toughening treatment and accordingly serves to obtain a facing panel with interference coloration having better toughening behavior. Of all the above mentioned materials, silicon nitride is the preferred material. The second transparent dielectric coating may also contain a very small quantity, generally less than 10% in atomic percentage, of the additional components. They are in particular doping elements whose main role is to improve the fabrication and/or use of the cathodes in the production of layers in vacuum deposition techniques. These elements are conventionally intended in particular to improve the conductivity of the materials constituting the cathodes. Such doping elements are for example titanium, aluminum.

The coating providing the opacity or quasi-opacity of the stack is such that the facing panel comprising it has, on the side opposite the face of the facing panel bearing said coating, a reflectance of at least 9% or more, preferably 15% or more and 98% or 95% or less, preferably 90%, or 85% or 80% less in the visible range. The reflectance is measured with a source corresponding to the CIE standard D65 "daylight" illuminant and at a solid angle of 2°, according to standard EN410. The material constituting at least one layer of the coating providing the opacity or quasi-opacity of the stack is selected from a metal, a metalloid, a carbide or a nitride. Preferably, the material constituting at least one layer of the coating providing the opacity or quasi-opacity is a metal. Preferably, the metal is selected from titanium, tungsten, niobium, chromium, nickel, copper, tantalum, zirconium, yttrium, palladium, iron, alloys or mixtures of at least two of these metals, stainless steels, stainless steels being preferred, the advantage resulting from the use of these metals being that, owing to their physical properties such as thermal expansion, they serve to obtain a facing panel with interference coloration having better toughening behavior. Stainless steels are preferred because in addition to their thermal expansion properties, they have good corrosion resistance. The geometric thickness of the coating providing the opacity or quasi-opacity of the stack is at least 30.0 nm or more, preferably at least 50.0 nm or more, more preferably at least 100.0 nm or more. The geometric thickness of the coating providing the opacity or quasi-opacity is at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, more preferably from 100.0 nm to 200.0 nm.

Moreover, when the glass substrate with interference coloration according to the invention is intended to be used as a reflecting, or even partially reflecting decorative facing panel, for indoor or outdoor applications, the use of silver or aluminum, metals that are commonly used in connection with this type of use, mention can be made for example of mirrors, to constitute the semi-transparent functional coating and/or the coating providing the opacity or quasi-opacity, preferably the two coatings, is excluded, since aluminum and silver are metals that are particularly reflecting but highly vulnerable to corrosion and demand additional protection of the enamel or paint type.

The expression "glass sheet" means a sheet of inorganic glass. This means a sheet of glass having a thickness of at least 0.5 mm or more and at most 20.0 mm or less, preferably at least 4.0 mm or more and at most 10.0 mm or less, comprising silicon as one of the indispensable constituents of the glass batch. Silica soda lime glasses, which are clear, extra-clear or colored in the mass or on the surface, are preferred. More preferably, clear or extra-clear silica soda lime glasses are preferred because of their low absorbance. The glass substrate with interference coloration for a facing panel according to the invention is such that the glass sheet is covered on one of its faces by the stack of coatings, said covered face being the face to be oriented on the building side, commonly called the internal face or face 2.

The stack of coatings covering one face of the glass sheet is opaque to the wavelengths of visible light, the term opaque means that the light transmittance is at most 4.0%, preferably at most 2.0%, more preferably at most 1.0%, the most preferably at most 0.1%, when it is applied to a silica soda lime float glass 4.0 mm thick, measured with a source corresponding to the CIE standard D65 "daylight" illuminant and at a solid angle of 2°, according to standard EN410.

According to a preferred embodiment, the glass substrate with interference coloration according to the invention is such that it comprises, consists, essentially consists of a sheet of glass, preferably a single glass sheet, covered on one of its faces by a stack of coatings such that said stack of coatings comprises in succession from the glass sheet at least:

a first transparent coating made from dielectric material, the optical thickness of the first transparent coating being at least 5.0 nm or more, preferably at least 10.0 nm or more, more preferably at least 20.0 nm or more, the most preferably at least 50.0 nm or more, preferably at least 70.0 nm or more, more preferably at least 100.0 nm or more, more preferably at least 110.0 nm or more and at most 258.0 nm or less, preferably at most 190.0 nm or less, more preferably at most 180.0 nm or less, the most preferably at most 150.0 nm or less, preferably at most 120.0 nm or less, preferably, the optical thickness falls within the range of values from 5.0 nm, preferably from 10.0 nm, more preferably from 20.0 nm to 258.0 nm, preferably from 50.0 nm to 190.0 nm, more preferably from 70.0 nm to 180.0 nm, the most preferably from 100.0 nm to 150.0 nm, preferably from 110.0 to 120.0 nm, a semi-transparent metallic functional coating, the color attenuation thickness of the metallic coating being at least 0.3 nm or more, preferably at least 0.9 nm or more, more preferably at least 1.5 nm or more, the most preferably at least 3.0 nm or more, preferably at least 6.5 nm or more, more preferably be at least 9.5 nm or more and at most 30.0 nm or less, preferably at most 28.0 nm or less, more preferably at most 25.2 nm or less, the most preferably at most 18.0 nm or less, preferably at most 15.0 nm or less. Preferably, the attenuation thickness falls within the range of values from 0.3 nm, preferably from 0.9 nm, more preferably from 1.5 nm, the most preferably from 3.0 nm to 30.0 nm, preferably from 0.3 nm to 28.0 nm, more preferably from 0.3 nm to 25.2 nm, the most preferably from 6.5 nm to 18.0 nm, preferably from 9.5 nm to 15.0 nm, the color attenuation thickness being equal to the product of the geometric thickness of the metallic functional coating multiplied by the complex part, k, of the refractive index at 550 nm of the metal constituting said coating, when the metal is stainless steel, the color attenuation thickness of the metallic coating corresponding to a geometric thickness is at least 0.1 nm or more, preferably at least 0.3 nm or more, more preferably at least 0.5 nm or more, the most preferably at least 2.0 nm or more, preferably at least 3.0 nm or more and at most 10.0 nm or less, preferably at most 8.4 nm or less, the most preferably at most 5.0 nm or less, preferably at most 4.0 nm or less. Preferably, the geometric thickness of the stainless steel coating falls within the range of values from 0.1 nm, preferably from 0.3 nm, more preferably from 0.5 nm to 10.0 nm, more preferably from 0.1 nm to 8.4 nm, the most preferably from 2.0 nm to 5.0 nm, advantageously from 3.0 nm to 4.0 nm, a second transparent coating made from a dielectric material, the optical thickness of the second transparent coating being at least 20.0 nm or more, preferably at least 30.0 nm or more, more preferably at least 100.0 nm or more, the most preferably at least 150.0 nm or more, preferably 170.0 nm or more and at most 300.0 nm or less, preferably at most 250.0 nm or less, more preferably at most 210.0 nm or less, the most preferably at most 200.0 nm or less. Preferably the optical thickness falls within the range of values from 20.0 nm, preferably from 30.0 nm, more preferably from 100.0 nm to 300.0 nm, more preferably from 150.0 nm to 250.0 nm, the most preferably from 170.0 nm to 200.0 nm, a coating providing the opacity or the quasi-opacity of said stack, the geometric thickness of said coating providing the opacity or quasi-opacity being at least 30.0 nm or more, preferably at least 50.0 nm or more, more preferably at least 100.0 nm or more, the most preferably at least 150.0 nm or more, the geometric thickness of the coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm, said coating providing the opacity or quasi-opacity comprising at least one metal, one metalloid, one nitride or one carbide.

According to a preferred alternative of the preceding embodiment, the glass substrate with interference coloration according to the invention is such that the first and second transparent coatings made from dielectric material are based on silicon nitride, the first and second nitride-based transparent coatings optionally containing an oxygen content expressed as atomic percentage of 100 or less, preferably 5% or less, more preferably 2% or less, and most preferably 0%.

According to a particular embodiment, the glass substrate with interference coloration, said substrate being preferably monolithic, for a facing panel according to the invention, is such that the semi-transparent functional coating and the coating providing the opacity or quasi-opacity are metallic coatings.

According to a particular embodiment, the glass substrate with interference coloration, said substrate being preferably monolithic, for a facing panel is such that it consists of a clear silica soda lime glass. Such glasses have a main composition falling within the following ranges, expressed as % of the weight of glass:

| SiO2 | 60-75 | MgO | 0-10 |
|---|---|---|---|
| Na2O | 10-20 | K2O | 0-10 |
| CaO | 0-16 | BaO | 0-2 |
| with BaO + CaO + MgO | 10-20 | | |
| and Na₂O + K₂O | 10-20 | | |

Preferably, the glass of the glass substrate with interference coloration, said substrate being preferably monolithic, for a facing panel is a float glass obtained in a molten float glass process on a planar surface of liquid tin, commonly called the float process.

According to a particular embodiment, the glass substrate with interference coloration, said substrate being preferably monolithic, for a facing panel according to the invention is such that it comprises, above the coating providing the opacity or quasi-opacity of the stack, a protective coating, the geometric thickness of the protective coating being at least 5.0 nm or more, preferably at least 20.0 nm or more, the geometric thickness of the protective coating being at most 500.0 nm or less. Preferably, the geometric thickness of the protective coating falls within the range of values from 5.0 nm to 500.0 nm, more preferably from 20.0 nm to 500.0 nm. The advantage offered by the protective coating is that it serves to protect the stack of coatings deposited on the glass sheet from physical damage (for example scratches) or chemical damage (for example oxidation (corrosion) and from contamination by chemical and atmospheric agents). More particularly, the glass substrate with interference coloration for a facing panel, said substrate being preferably monolithic, comprising a protective coating has better behavior with regard to the various toughening processes. The material constituting at least one layer of the protective coating is selected from:

a chemical compound selected from silicon, carbon, iron, chromium, nickel, aluminum, copper, molybdenum, zinc, tin, cobalt, vanadium, yttrium, zirconium, tantalum or an alloy or a mixture of at least two of these compounds such as nickel-chromium (NiCr) or NiCrAlY, stainless steel, preferably the chemical compound is selected from carbon, chromium, nickel, aluminum, an oxide selected from oxides of silicon, aluminum, titanium, tin, zinc, zirconium, mixed oxides of at least two of these elements, preferably selected from oxides of titanium, tin, silicon, mixed oxides of at least two of these elements, the oxide or the mixed oxide optionally being doped with aluminum, boron, yttrium, a nitride selected from nitrides of aluminum, silicon, mixed aluminum and silicon nitrides, preferably silicon nitride, the nitride or the mixed nitride being optionally doped with aluminum, boron, yttrium, an oxynitride selected from oxynitrides of silicon, aluminum, mixed aluminum and silicon oxynitrides, preferably the silicon oxynitrides, the oxynitride or mixed oxynitride being optionally doped with aluminum, boron, yttrium.

According to a particular alternative of the preceding embodiment, the glass substrate with interference coloration, said substrate being preferably monolithic, for a facing panel according to the invention is such that the material constituting at least one layer of the protective coating is a chemical compound selected from carbon, chromium, nickel, aluminum, stainless steel or a metal alloy such as nickel-chromium (NiCr) or NiCrAlY, these compounds serving to obtain better oxidation behavior of the glass substrate with interference coloration according to the invention in comparison with their corresponding oxides, oxynitrides or nitrides. The preferred material constituting at least one layer of the protective coating is stainless steel.

According to a particular alternative of the preceding two embodiments, the glass substrate with interference coloration, said substrate being preferably monolithic, for a facing panel according to the invention is such that the protective coating comprises at least one adhesive metallic layer, said adhesive metallic layer being the layer of the protective coating nearest to the coating providing the opacity or quasi-opacity of the stack. Advantageously, this adhesive metallic layer has a geometric thickness of at least 10.0 nm or more, preferably at least 15.0 nm or more, the geometric thickness of the adhesive metallic layer being at most 100.0 nm or less, preferably at most 50.0 nm or less. Preferably, the geometric thickness of the adhesive layer is between 10.0 nm and 100.0 nm, preferably between 15.0 nm and 50.0 nm. The material constituting the adhesive layer is based on chromium.

According to a particular embodiment, when the glass substrate with interference coloration, said substrate being preferably monolithic, for a facing panel is intended to undergo toughening, the protective coating may advantageously comprise a terminal layer, in other words the layer of the protective coating furthest from the glass sheet constituting the glass substrate, made from carbon. The advantage of this layer is that it serves to obtain temporary mechanical and physicochemical protection, until the toughening process, this layer being destroyed by oxidation during the toughening process.

According to a particular embodiment, the glass substrate with interference coloration, said substrate being preferably monolithic, for a facing panel according to the invention is such that it comprises, between the glass sheet and the first transparent coating made from dielectric material, a transparent coating improving the adhesion, said coating being made from a dielectric material. Advantageously, the material constituting the coating improving the adhesion has a refractive index close to the refractive index of the glass sheet. The expression "refractive index close to the refractive index of the glass sheet" means that the absolute value of the difference between the refractive index of the material constituting the coating improving the adhesion and the refractive index of the glass sheet has a value lower than 0.13, said indexes being the refractive indexes of the various materials at a wavelength of 550 nm. Preferably, the refractive index of the material constituting the coating improving the adhesion has a value falling within the range of values between 1.4 and 1.65. The material constituting the coating improving the adhesion is preferably selected from silicon dioxide and silicon oxynitride. The thickness of the coating improving the adhesion is at least above 0.0 nm, preferably at least 10.0 nm or more, more preferably at least 15.0 nm or more. The thickness of the coating improving the adhesion is at most 50.0 nm or less, preferably at most 30.0 nm or less. Preferably, the coating improving the adhesion has the geometric thickness falling within the range of values ranging from 0.0 nm to 50.0 nm, preferably from 10.0 nm to 50.0 nm, more preferably from 15.0 nm to 30.0 nm. The advantage of using the coating improving the adhesion is that it serves to reduce, or even to avoid, the micro-cracks appearing during the curving and toughening operations.

According to a particular embodiment, the glass substrate with interference coloration, said substrate being preferably monolithic, for a facing panel according to the invention is such that at least one semi-transparent functional coating and at least one layer of the coating providing the opacity or quasi-opacity of the stack have the same chemical composition.

According to a particular embodiment, the glass substrate with interference coloration, said substrate being preferably monolithic, for a facing panel according to the invention is such that it comprises, consists, essentially consists of, in succession from the glass sheet, at least:

a coating improving the adhesion made from silicon oxynitride, the geometric thickness of the coating improving the adhesion being at least above 0.0 nm, preferably at least 10.0 nm or more, more preferably at least 15.0 nm or more, the geometric thickness of the coating improving the adhesion being at most 50.0 nm or less, preferably at most 30.0 nm or less. Preferably, the thickness of the coating improving the adhesion is at least above 0.0 nm and at most 50.0 nm or less, preferably at least 10.0 nm or more and at most 50.0 nm or less, more preferably at least 15.0 nm or more and at most 30.0 nm or less, a first transparent coating made from dielectric material of silicon nitride, the geometric thickness of the transparent coating being at least 10.0 nm or more, preferably at least 25.0 nm or more, more preferably at least 35.0 nm or more, the most preferably at least 50.0 nm or more, preferably at least 55.0 nm or more, the geometric thickness of the transparent coating being at most 129.0 nm or less, preferably at most 95.0 nm or less, more preferably at most 90.0 nm or less, the most preferably at most 75.0 nm or less, preferably at most 60.0 nm or less. Preferably, the thickness of said coating is between 10.0 nm and 129.0 nm, preferably between 25.0 nm and 95.0 nm, preferably between 35.0 nm and 90.0 nm, the most preferably between 50.0 nm and 75.0 nm, advantageously between 55.0 nm and 60.0 nm, a semi-transparent metallic functional coating, the color attenuation thickness of the coating being at least 0.3 nm or more, preferably at least 0.9 nm or more, more preferably at least 1.5 nm or more, the most preferably at least 3.0 nm or more, preferably at least 6.5 nm or more, the most preferably at least 9.5 nm or more, the attenuation thickness being at most 30.0 nm or less, preferably at most 28.0 nm or less, more preferably at most 25.2 nm or less, the most preferably at most 18.0 nm or less, preferably at most 15.0 nm or less. Preferably, the attenuation thickness falls within the range of values from 0.3 nm, preferably from 0.9 nm, more preferably from 1.5 nm, the most preferably from 3.0 nm to 30.0 nm, preferably from 0.3 nm to 28.0 nm, more preferably from 0.3 nm to 25.2 nm, the most preferably from 6.5 nm to 18.0 nm, preferably from 9.5 nm to 15.0 nm, the color attenuation thickness being equal to the product of the geometric thickness of the metallic functional coating multiplied by the complex part, k, of the refractive index at 550 nm of the metal constituting said coating, when the metal is stainless steel, the color attenuation thickness of the metallic coating corresponds to a geometric thickness of at least 0.1 nm or more, preferably at least 0.3 nm or more, more preferably at least 0.5 nm or more, the most preferably at least 2.0 nm or more, advantageously at least 2.0 nm or more, the geometric thickness being at most 10.0 nm or less, preferably at most 8.4 nm or less, the most preferably at most 5.0 nm or less, advantageously at most 40.0 nm or less. Preferably, the geometric thickness of the metallic functional coating of stainless steel falls within the range of values from 0.1 nm, preferably from 0.3 nm, more preferably from 0.5 nm to 10.0 nm, more preferably from 0.1 nm to 8.4 nm, the most preferably from 2.0 nm to 5.0 nm, advantageously from 3.0 nm to 4.0 nm, a second transparent coating made from dielectric material of silicon nitride, the geometric thickness of the second transparent coating being at least 10.0 nm or more, preferably at least 50.0 nm or more, more preferably at least 75.0 nm or more, the most preferably at least 85.0 nm or more, the geometric thickness of the second transparent coating being at most 150.0 nm or less, preferably at most 125.0 nm or less, the most preferably at most 100.0 nm or less. Preferably, the geometric thickness of the second transparent coating is at most 150.0 nm or less, preferably 105.0 nm or less, the transparent coating falling within the range of values from 10.0 nm to 150.0 nm, preferably from 50.0 nm to 150.0 nm, more preferably from 75.0 nm to 125.0 nm, the most preferably from 85.0 nm to 100.0 nm, a metallic coating providing the opacity or quasi-opacity of the stack comprising at least one layer, preferably the first layer, made from stainless steel, the geometric thickness of the metallic coating providing the opacity or quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, more preferably from 50.0 nm to 1000.0 nm, the most preferably from 100.0 nm to 200.0 nm.

According to a particular alternative of the preceding embodiment, the glass substrate with interference coloration, said substrate being preferably monolithic, for a facing panel is such that it comprises a protective coating comprising at least one stainless steel layer.

According to another particular embodiment, the glass substrate with interference coloration, said substrate being preferably monolithic, for a facing panel according to the invention is such that it comprises at least:
- a first transparent coating made from a dielectric material based on silicon nitride, the geometric thickness of the first transparent coating being between 10.0 nm and 120.0 nm,
- a metallic functional coating made from titanium, the geometric thickness of the first metallic functional coating falling within the range of values from 1.0 nm to 10.0 nm, preferably in the range of values from 1.0 nm to 5.0 nm,
- a second transparent coating made from a dielectric material of silicon nitride, the geometric thickness of the second transparent coating falling within the range of values from 20.0 nm to 120.0 nm,
- a metallic coating providing the opacity or quasi-opacity of the stack comprising at least one first layer of titanium, the geometric thickness of the metallic coating providing the opacity or the quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm.

According to a particular embodiment, the glass substrate with interference coloration, said substrate being preferably monolithic, for a facing panel according to the invention is such that it comprises at least:
- a first transparent coating made from a dielectric material based on silicon oxynitride, the geometric thickness of the first transparent coating being between 10.0 nm and 120.0 nm,
- a metallic functional coating made from titanium, the geometric thickness of the first metallic functional coating falling within the range of values from 1.0 nm to 10.0 nm, preferably in the range of values from 1.0 nm to 5.0 nm,
- a second transparent coating made from a dielectric material of silicon oxynitride, the geometric thickness of the second transparent coating falling within the range of values from 20.0 nm to 120.0 nm,
- a metallic coating providing the opacity or quasi-opacity of the stack comprising at least one first layer of titanium, the geometric thickness of the metallic coating providing the opacity or the quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm.

According to an advantageous alternative of the preceding two embodiments, a protective overcoat is deposited above the metallic coating providing the opacity or quasi-opacity, the material constituting said overcoat being based on a compound selected from carbon, silicon oxynitride, silicon nitride, silicon carbide, stainless steel, stainless steel being preferred, said overcoat having a geometric thickness of at least 5.0 nm or more and at most 50.0 nm or less. The glass substrate with interference coloration, said substrate being preferably monolithic, for a facing panel advantageously comprises a transparent coating improving the adhesion, said coating being made from a dielectric material selected from silicon dioxide or silicon oxynitride. The thickness of the coating improving the adhesion is at least over 0.0 nm, preferably at least 10.0 nm or more, more preferably at least 15.0 nm or more. The thickness of the coating improving the adhesion is at most 50.0 nm or less, preferably 30.0 nm or less. Preferably, the coating improving the adhesion has a geometric thickness falling within the range of values from 0.0 nm to 50.0 nm, preferably from 10.0 nm to 50.0 nm, more preferably from 15.0 nm to 30 nm. The advantage of the use of the coating improving the adhesion is that it serves to reduce, or even avoid, the micro-cracks appearing during the curving and toughening operations.

According to another particular embodiment, the glass substrate with interference coloration for a facing panel according to the invention is such that it comprises at least:
- a coating improving the adhesion made from silicon oxynitride, the geometric thickness of the coating improving the adhesion being at least over 0.0 nm and at most 50.0 nm or less,
- a first transparent coating made from a dielectric material based on silicon nitride, the geometric thickness of the first transparent coating being between 10.0 nm and 120.0 nm,
- a metallic functional coating made from titanium, the geometric thickness of the first metallic functional coating falling within the range of values from 1.0 nm to 10.0 nm, preferably in the range of values from 1.0 nm to 5.0 nm,
- a second transparent coating made from a dielectric material of silicon nitride, the geometric thickness of the second transparent coating falling within the range of values from 20.0 nm to 120.0 nm,
- a metallic coating providing the opacity or quasi-opacity of the stack comprising at least one first layer of titanium, the geometric thickness of the metallic coating providing the opacity or the quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm.

According to a preferred embodiment, the glass substrate with interference coloration for a facing panel according to the invention is such that it comprises in succession from the glass sheet, at least:
- a coating improving the adhesion made from silicon oxynitride, the geometric thickness of the coating improving the adhesion being at least over 0.0 nm and at most 50.0 nm or less,
- a first transparent coating made from a dielectric material of silicon nitride, the geometric thickness of the first transparent coating being between 10.0 nm or more and at most 129.0 nm or less,
- a semi-transparent metallic functional coating made from stainless steel, the geometric thickness of said coating falling within the range of values from 1.0 nm to 10.0 nm,
- a second transparent coating made from a dielectric material of silicon nitride, the geometric thickness of the second transparent coating being at least 10.0 nm or more and at most 150.0 nm or less,
- a metallic coating providing the opacity or quasi-opacity of the stack comprising at least one first layer of titanium, the geometric thickness of the metallic coating providing the opacity or the quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm.

According to another particular embodiment, the glass substrate with interference coloration, said substrate being preferably monolithic, for a facing panel according to the invention is such that it comprises at least:
- a first transparent coating made from dielectric material, the geometric thickness of the first transparent layer being between 10.0 nm and 120.0 nm, said first coating comprising at least two layers having different chemical compositions, the first layer from the glass substrate comprising a silicon oxide also called "coating improving the adhesion" and a second layer comprising a silicon oxynitride or "first transparent coating made from dielectric material stricto senso",
- a metallic functional coating made from titanium, the geometric thickness of the first metallic functional coating falling within the range of values from 1.0 nm to 10.0 nm, preferably in the range of values from 1.0 nm to 5.0 nm,
- a second transparent coating made from a dielectric material of silicon oxynitride, the geometric thickness of the second transparent coating falling within the range of values from 20.0 nm to 120.0 nm,
- a metallic coating providing the opacity or quasi-opacity of the stack comprising at least one first layer of titanium, the geometric thickness of the metallic coating providing the opacity or the quasi-opacity being at least 30.0 nm or more, preferably at least 50.0 nm or more, more preferably at least 100.0 nm or more, the geometric thickness of the metallic coating providing the opacity or quasi-opacity being at most 1000.0 nm or less, preferably at most 200.0 nm or less. Preferably, the geometric thickness of said coating falls within the range of values from 30.0 nm to 1000.0 nm, preferably from 50.0 nm to 1000.0 nm, the most preferably from 100.0 nm to 200.0 nm.

According to an advantageous alternative of the preceding embodiments, a protective overcoat is deposited above the metallic coating providing the opacity or quasi-opacity, the material constituting said overcoat being based on a compound selected from carbon, silicon oxynitride, silicon nitride, silicon carbide, stainless steel, stainless steel being preferred, said overcoat having a geometric thickness of 5.0 nm or more and at most 50.0 nm or less.

According to a particular embodiment, the glass substrate with interference coloration, said substrate being preferably monolithic, for a facing panel according to the invention is such that said glass substrate is toughenable. A toughenable glass substrate means that the stack of coatings of the glass substrate with interference coloration for a facing panel according to the invention has good toughening behavior, in other words, that said substrate does not undergo any mechanical deterioration (delamination, crevasses) during the toughening.

According to a particular embodiment, the glass substrate with interference coloration according to the invention does not under go any major changes of its colorimetric coordinates before and after toughening. The expression "major modifications of its colorimetric coordinates" means a glass substrate with interference coloration whereof the colorimetric coordinates (L*, a*, b*) are relatively unaffected by the toughening process. The expression "colorimetric coordinates (L*, a*, b*) are relatively unaffected" means that the value $\Delta E^*_{t,v,\alpha}$ is lower than 6.0, preferably lower than 4.0, more preferably lower than 2.0 where $\Delta E^*_{v,\alpha} = \sqrt{(L^*_{atv,\alpha} - L^*_{tv,\alpha})^2 + (a^*_{atv,\alpha} - a^*_{tv,\alpha})^2 + (b^*_{atv,\alpha} - b^*_{tv,\alpha})^2}$ for any observation angle between 0 and 60°, where $L^*_{atv,\alpha}$ represents the colorimetric coordinates $L^*_v$ of the glass substrate with interference coloration for a facing panel before toughening, $L^*_{tv,\alpha}$ represents the colorimetric coordinates $L^*_{v,\alpha}$ of the glass substrate with interference coloration for a facing panel after toughening, $a^*_{atv,\alpha}$ represents the colorimetric coordinates $a^*_{v,\alpha}$ of the glass substrate with interference coloration for a facing panel before toughening, $a^*_{tv,\alpha}$ represents the colorimetric coordinates $a^*_{v,\alpha}$ of the glass substrate with interference coloration for a facing panel after toughening, $b^*_{atv,\alpha}$ represents the colorimetric coordinates $b^*_{v,\alpha}$ of the glass substrate with interference coloration for a facing panel before toughening, $b^*_{tv,\alpha}$ represents the colorimetric coordinates $b^*_{v,\alpha}$ of the glass substrate with interference coloration for a facing panel after toughening, The subscript v,α indicates that the measurement was taken on the glass side, in other words, on the uncoated side at the same angle α.

According to a particular embodiment, the glass substrate with interference coloration according to the invention is such that the modifications of the colorimetric coordinates after toughening are relatively independent of the toughening process. The expression "major modifications of these colorimetric coordinates" means a glass substrate with interference coloration whereof the colorimetric coordinates ($L^*_{tv,\ \alpha}$, $a^*_{tv,\ \alpha}$, $b^*_{tv,\ \alpha}$) are relatively unaffected by the thermal toughening process. The expression "colorimetric coordinates ($L^*_{tv, \alpha}$, $a^*_{tv, \alpha}$, $b^*_{tv, \alpha}$) are relatively unaffected" means that the value $\Delta E^*_{tv, \alpha}$ is 4.0 or less, preferably 2.0 or less, more preferably 1.0 or less, the most preferably equal to 0.0, where $\Delta E^*_{t,v,\alpha} = \sqrt{(L^*_{t,v,\alpha, tps1,t°1} - L^*_{t,v,\alpha, tps2,t°2})^2 + (a^*_{t,v,\alpha,tps1,t°1} - a^*_{t,v,\alpha, tps2,t°2})^2 + (b^*_{t,v,\alpha, tps1,t°1} - b^*_{t,v,\alpha, tps2,t°2})^2}$ for any observation angle $\alpha$ between 0 and 60°, where $L^*_{t,v,\alpha, tps1,t°1}$ and $L^*_{t,v,\alpha, tps2,t°2}$ respectively represent the colorimetric coordinates $L^*_{v,\alpha}$ of the glass substrate with interference coloration for a facing panel after toughening at a temperature t° 1 and a time tps 1 and at a temperature t° 2 and a time tps 2, $a^*_{t,v,\alpha,tps1,t°1}$ and $a^*_{t,v,\alpha,tps2,t°2}$ respectively represent the colorimetric coordinates $a^*_{t,v,\alpha}$ of the glass substrate with interference coloration for a facing panel after toughening at a temperature t° 1 and a time tps 1 and at a temperature t° 2 and a time tps 2.

$b^*_{t,v,\alpha,tps1,t°1}$ and $b^*_{t,v,\alpha,tps2,t°2}$ respectively represent the colorimetric coordinates $b^*_{t,v,\alpha}$ of the glass substrate with interference coloration for a facing panel after toughening at a temperature t° 1 and a time tps 1 and at a temperature t° 2 and a time tps 2.

The subscript v, a indicates that the measurement was taken on the glass side, in other words, on the uncoated side at an angle $\alpha$. The two toughening processes are distinguished by at least one of the parameters t° or tps.

According to a particular embodiment, the glass substrate with interference coloration for a facing panel according to the invention is such that said glass substrate with interference coloration constitutes the opaque zone of a fully glazed façade and has the same color characteristics after toughening as those of the laminated glazing, such as for example a glazing coated with a low-emissivity coating, constituting the viewing zone with which said glass substrate with interference coloration for a facing panel must be associated, said glass substrates with interference coloration and laminated glazing are such that their respective coatings are deposited on a glass sheet having an identical chemical composition.

The expression "same color characteristics" means that the value $\Delta E^*_{fav,\alpha}$ is lower than 6.0, preferably lower than 4.0, more preferably lower than 2.0 with $\Delta E^*_{fav,\alpha} = \sqrt{(\Delta L^*_{fav,\alpha})^2 + (\Delta a^*_{fav,\alpha})^2 + (\Delta bfa^*_{v,\alpha})^2}$ for any observation angle $\alpha$ between 0 and 60°, where $\Delta L^*_{fav,\alpha}$ represents the difference between the colorimetric coordinates $L^*_{av,\alpha}$ of an opaque zone consisting of the glass substrate with interference coloration for a facing panel after toughening and $L^*_{fv,\alpha}$ of a viewing zone corresponding to a laminated glazing, $\Delta a^*_{av,\alpha\ v,\alpha}$ represents the difference between the colorimetric coordinates $a^*_{av,\alpha}$ of an opaque zone consisting of the glass substrate with interference coloration for a facing panel after toughening and $a^*_{fv,\alpha}$ of a viewing zone corresponding to a laminated glazing, $\Delta b^*_{fav,\alpha}$ represents the difference between the colorimetric coordinates $b^*_{av,\alpha}$ of an opaque zone consisting of the glass substrate with interference coloration for a facing panel after toughening and $b^*_{fv,\alpha}$ of a viewing zone corresponding to a laminated glazing.

The subscript v,α indicates that the measurement was taken on the glass side, in other words, on the uncoated site at an angle α.

The values L*, a* and b* correspond to the colorimetric coordinates according to the CIE Lab model of representation of colors developed by the International Commission on Illumination (Commission Internationale de l'Eclairage (CIE)) (CIE 15:2004). These coordinates are determined using a source corresponding to the CIE standard D65 "daylight" illuminant at an angle α.

According to a particular embodiment, the glass substrate with interference coloration, said substrate being preferably monolithic, for a facing panel according to the invention is such that it comprises, consists, essentially consists of, in succession from the glass sheet, at least:

- a first transparent coating made from dielectric material based on at least one compound selected from silicon nitride, aluminum nitride, mixed aluminum-silicon nitrides, zinc oxide, mixed zinc-tin oxides, the nitrides being preferred, their compositions causing slight changes in the optical properties of the semi-transparent functional coating during the toughening of the substrate, said coating having an optical thickness of between 60.0 nm and 135.0 nm,
- a metallic semi-transparent functional coating based on at least one compound selected from titanium, chromium, stainless steel, palladium, titanium nitride, stainless steel being preferred because of its mechanical and chemical stability, the geometric thickness of said coating falling within the range of values from 0.5 nm to 7.0 nm,
- a second transparent coating made from a dielectric material based on at least one compound selected from silicon nitride, aluminum nitride, mixed aluminum-silicon nitrides, zinc oxide, mixed zinc-tin oxides, the nitrides being preferred, their compositions causing slight changes in the optical properties of the semi-transparent functional coating during their deposition or toughening of the substrate of said coating having an optical thickness of between 80.0 nm and 210.0 nm.
- a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the preceding three embodiments is a toughenable substrate which is suitable for use as spandrel and having the same color characteristics as the laminated glazing of the type Stopray Vision-50, Stopray Vision-50T, Stopray Vision-60T, Stopray Safir, Planibel Energy N, Planibel Energy NT, Stopray Galaxy, UltraVision-50 (UV50) sold by AGC constituting the viewing zones, corresponding to the windows of a fully glazed façade.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 114.4 nm to 122.4 nm, preferably about 118.4 nm,
- a semi-transparent functional coating made from stainless steel, the geometric thickness of said coating falling within the range of values from 3.0 nm to 3.8 nm preferably about 3.4 nm,
- a second transparent coating made from a dielectric material of silicon nitride, said coating having an optical thickness falling between the range of values from 183.0 nm to 204.8 nm, preferably about 194.0 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Stopray Vision-50T.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 109.4 nm to 116.6 nm, preferably about 114.2 nm,
- a semi-transparent functional coating made from stainless steel, the geometric thickness of said coating falling within the range of values from 3.4 nm to 4.2 nm preferably about 3.8 nm,
- a second transparent coating made from a dielectric material of silicon nitride, said coating having an optical thickness falling between the range of values from 172.2 nm to 190.4 nm, preferably about 181.4 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Stopray Vision-60T.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 113.6 nm to 124.0 nm, preferably about 118.8 nm,
- a semi-transparent functional coating made from stainless steel, the geometric thickness of said coating falling within the range of values from 3.2 nm to 4.0 nm preferably about 3.6 nm,
- a second transparent coating made from a dielectric material of silicon nitride, said coating having an optical thickness falling between the range of values from 166.2 nm to 180.2 nm, preferably about 173.2 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Planibel Energy NT.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 107.3 nm to 117.8 nm, preferably about 112.8 nm,
- a semi-transparent functional coating made from stainless steel, the geometric thickness of said coating falling within the range of values from 2.9 nm to 3.7 nm preferably about 3.3 nm,
- a second transparent coating made from a dielectric material of silicon nitride, said coating having an optical thickness falling between the range of values from 171.6 nm to 197.6 nm, preferably about 184.6 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Stopray Galaxy.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 42.8 nm to 48.3 nm, preferably about 45.6 nm,
- a semi-transparent functional coating made from stainless steel, the geometric thickness of said coating falling within the range of values from 4.2 nm to 5.6 nm preferably about 5.0 nm,
- a second transparent coating made from a dielectric material of silicon nitride, said coating having an optical thickness falling between the range of values from 92.0 nm to 296.0 nm, preferably about 94.3 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Stopray UltraVision-50.

According to a particular embodiment, the glass substrate with interference coloration, said substrate being preferably monolithic, for a facing panel according to the invention is such that it comprises, consists, essentially consists of, in succession from the glass sheet, at least:
- a first transparent coating made from dielectric material based on at least one compound selected from silicon nitride, aluminum nitride, mixed aluminum-silicon nitrides, zinc oxide, mixed aluminum-silicon nitrides, zinc oxide, mixed zinc-tin oxides, the nitrides being preferred, their compositions causing slight changes in the optical properties of the semi-transparent functional coating during the toughening of the substrate, said coating having an optical thickness of between 50.0 nm and 90.0 nm,
- a semi-transparent functional coating based on at least one compound selected from metals and nitrides, preferably based on at least one compound selected from titanium, chromium, stainless steel, palladium, titanium nitride, stainless steel being preferred because of its mechanical and chemical stability, the geometric thickness of said coating falling within the range of values from 0.1 nm to 3.0 nm,
- a second transparent coating made from a dielectric material based on at least one compound selected from silicon nitride, aluminum nitride, mixed aluminum-silicon nitrides, zinc oxide, mixed zinc-tin oxides, the nitrides being preferred, their compositions causing slight changes in the optical properties of the semi-transparent functional coating during their deposition or toughening of the substrate of said coating having an optical thickness of between 100.0 nm and 170.0 nm.
- a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the preceding three embodiments is a toughenable substrate which is suitable for use as spandrel and having the same color characteristics as the laminated glazing of the type Stopray Vision-36T sold by AGC constituting the viewing zones, corresponding to the windows of a fully glazed façade.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 65.8 nm to 89.0 nm, preferably about 77.4 nm,
- a semi-transparent functional coating made from stainless steel, the geometric thickness of said coating falling within the range of values from 0.1 nm to 1.3 nm preferably about 0.7 nm,
- a second transparent coating made from a dielectric material of silicon nitride, said coating having an optical thickness falling between the range of values from 114.6 nm to 151.8 nm, preferably about 133.2 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- said substrate being a toughenable substrate suitable for use as spandrel and having the same color characteristics as the laminated glazings of the type Stopray Vision-36T.

According to a particular embodiment, the glass substrate with interference coloration, said substrate being preferably monolithic, for a facing panel according to the invention is such that it comprises, consists, essentially consists of, in succession from the glass sheet, at least:
- a first transparent coating made from dielectric material based on at least one compound selected from silicon nitride, aluminum nitride, mixed aluminum-silicon nitrides, zinc oxide, mixed zinc-tin oxides, the nitrides being preferred, their compositions causing slight changes in the optical properties of the semi-transparent functional coating during the toughening of the substrate, said coating having an optical thickness of between 110.0 nm and 190.0 nm,
- a semi-transparent functional coating based on at least one compound selected from metals and nitrides, preferably based on at least one compound selected from titanium, chromium, stainless steel, palladium, titanium nitride, stainless steel being preferred because of its mechanical and chemical stability, the geometric thickness of said coating falling within the range of values from 2.0 nm to 12.0 nm,
- a second transparent coating made from a dielectric material based on at least one compound selected from silicon nitride, aluminum nitride, mixed aluminum-silicon nitrides, zinc oxide, mixed zinc-tin oxides, the nitrides being preferred, their compositions causing slight changes in the optical properties of the semi-transparent functional coating during their deposition or toughening of the substrate of said coating having an optical thickness of between 30.0 nm and 80.0 nm.
- a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the preceding three embodiments is a toughenable substrate which is suitable for use as spandrel and having the same color characteristics as the laminated glazing of the type Stopray Neo sold by AGC constituting the viewing zones, corresponding to the windows of a fully glazed façade.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 130.6 nm to 153.8 nm, preferably about 142.4 nm,
- a semi-transparent functional coating made from stainless steel, the geometric thickness of said coating falling within the range of values from 2.8 nm to 8.4 nm preferably about 5.6 nm,
- a second transparent coating made from a dielectric material of silicon nitride, said coating having an optical thickness falling between the range of values from 23.2 nm to 69.4 nm, preferably about 46.2 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
said substrate being a toughenable substrate suitable for use as spandrel and having the same color characteristics as the laminated glazings of the type Stopray Neo.

According to a preferred embodiment, the substrate with interference coloration, the substrate being preferably monolithic, for a facing panel according to the invention is such that it comprises, consists, essentially consists of, in succession from the glass sheet:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 108.0 nm to 130.0 nm, preferably about 119.0 nm,
- a semi-transparent functional coating made from stainless steel, the geometric thickness of said coating falling within the range of values from 1.0 nm to 6.0 nm preferably about 2.5 nm,
- a second transparent coating made from a dielectric material of silicon nitride, said coating having an optical thickness falling between the range of values from 185.0 nm to 225.0 nm, preferably about 205.0 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
said substrate being a toughenable substrate suitable for use as spandrel and having the same color characteristics as the laminated glazings of the type Stopray Neo.

According to a particular embodiment, the glass substrate with interference coloration, said substrate being preferably monolithic, for a facing panel according to the invention is such that it comprises, consists, essentially consists of, in succession from the glass sheet, at least:
- a first transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, said coating having an optical thickness of between 100.0 nm and 165.0 nm,
- a semi-transparent functional coating based on at least one compound selected from metals or nitrides, preferably based on at least one compound selected from titanium, chromium, stainless steel, palladium, titanium nitride, stainless steel being preferred because of its mechanical and chemical stability, the geometric thickness of said coating falling within the range of values from 0.5 nm to 20.0 nm,
- a second transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, the nitrides being preferred because their deposition causes few changes in the optical properties of the semi-transparent functional coating, said coating having an optical thickness of between 235.0 nm and 315.0 nm,
- a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the preceding three embodiments is a substrate, optionally toughened, suitable for use as a decorative facing panel for indoor or outdoor applications having color characteristics L*, a*, b* in the C.I.E.L.A.B system such that 57≤L*≤71, −2.7≤a*≤1.3, −4.8≤b*≤1.2, more particularly L*=64, a*=−0.7, b*=−1.8 and measured according to the D65 illuminant at 10° in reflection on the side of the uncovered face of the glass sheet by an apparatus of the UltraScan type and a reflectance of between 27.6% and 37.6%, more particularly equal to 32.6%, measured according to the D65 illuminant at 2° in reflection of the side of the uncovered face of the glass sheet by an apparatus of the UltraScan type.

According to a particular embodiment, the substrate with interference coloration, the substrate being preferably monolithic, for a facing panel according to the invention is such that it comprises, consists, essentially consists of, in succession from the glass sheet, at least:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 120.3 nm to 146.0 nm, preferably about 134.2 nm,
- a semi-transparent functional coating made from stainless steel, the geometric thickness of said coating falling within the range of values from 1.5 nm to 2.5 nm preferably about 1.9 nm,
- a second transparent coating made from a dielectric material of silicon nitride, said coating having an optical thickness falling between the range of values from 250.8 nm to 294.4 nm, preferably about 272.6 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
- The substrate, optionally toughened, is suitable for use as a decorative facing panel for indoor or outdoor applications having color characteristics L*, a*, b* in the C.I.E.L.A.B system such that 57≤L*≤71, −2.7≤a*≤1.3, −4.8≤b*≤1.2, more particularly L*=64, a*=−0.7, b*=−1.8 and measured according to the D65 illuminant at 10° in reflection on the side of the uncovered face of the glass sheet by an apparatus of the UltraScan type and a reflectance of between 27.6% and 37.6%, more particularly equal to 32.6%, measured according to the D65 illuminant at 2° in reflection of the side of the uncovered face of the glass sheet by an apparatus of the type, the colorimetric coordinates of said substrate being relatively independent of the observation angle. The expression "colorimetric coordinates of said substrate being relatively independent of the observation angle" means a variation on colorimetric coordinates ΔE* of 6 or less, and for any observation angle from 0° to 55°.

According to a particular embodiment, the glass substrate with interference coloration, said substrate being preferably monolithic, for a facing panel according to the invention is such that it comprises, consists, essentially consists of, in succession from the glass sheet, at least:
- a first transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, said coating having an optical thickness of between 100.0 nm and 160.0 nm,
- a semi-transparent functional coating based on at least one compound selected from metals or nitrides, preferably based on at least one compound selected from titanium, chromium, stainless steel, palladium, titanium nitride, stainless steel being preferred because of its mechanical and chemical stability, the geometric thickness of said coating falling within the range of values from 1.0 nm to 20.0 nm, a second transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, the nitrides being preferred because their deposition causes few changes in the optical properties of the semi-transparent functional coating, said coating having an optical thickness of between 200.0 nm and 270.0 nm, a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the preceding three embodiments is a substrate, optionally toughened, suitable for use as a decorative facing panel for indoor or outdoor applications having color characteristics L*, a*, b* in the C.I.E.L.A.B system such that 52≤L*≤66, −4.9≤a*≤−0.9, −15.8≤b*≤−9.8, more particularly L*=59, a*=−2.9, b*=−12.8 and measured according to the D65 illuminant at 10° in reflection on the side of the uncovered face of the glass sheet by an apparatus of the UltraScan type and a reflectance of between 21.4% and 31.4%, more particularly equal to 26.4%, measured according to the D65 illuminant at 2° in reflection of the side of the uncovered face of the glass sheet by an apparatus of the UltraScan type.

According to a particular embodiment, the substrate with interference coloration, the substrate being preferably monolithic, for a facing panel according to the invention is such that it comprises, consists, essentially consists of, in succession from the glass sheet, at least:
a coating improving the adhesion made from silicon oxynitride, the geometric thickness of the coating improving the adhesion being at least above 0.0 nm and at most 30.0 nm or less, preferably about 15.0 nm, a first transparent coating made from a dielectric material of silicon nitride, said coating having an optical thickness falling within the range of values from 116.0 nm to 142.0 nm, preferably about 129.0 nm, a semi-transparent functional coating made from stainless steel, the geometric thickness of said coating falling within the range of values from 2.8 nm to 4.4 nm preferably about 3.6 nm, a second transparent coating made from a dielectric material of silicon nitride, said coating having an optical thickness falling between the range of values from 218.4 nm to 246.4 nm, preferably about 232.4 nm, a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel, The substrate, optionally toughened, is suitable for use as a decorative facing panel for indoor or outdoor applications having color characteristics L*, a*, b* in the C.I.E.L.A.B system such that 52≤L*≤66, −4.9≤a*≤−0.9, −15.8≤b*≤−9.8, more particularly L*=59, a*=−2.9, b*=−12.8 and measured according to the D65 illuminant at 10° in reflection on the side of the uncovered face of the glass sheet by an apparatus of the UltraScan type and a reflectance of between 21.4% and 31.4%, more particularly equal to 26.4%, measured according to the D65 illuminant at 2° in reflection of the side of the uncovered face of the glass sheet by an apparatus of the type; the colorimetric coordinates of said substrate being relatively independent of the observation angle. The expression "colorimetric coordinates of said substrate being relatively independent of the observation angle" means a variation on colorimetric coordinates ΔE* equal to 6 or less, and for any observation angle from 0° to 55°.

According to a particular embodiment, the glass substrate with interference coloration, said substrate being preferably monolithic, for a facing panel according to the invention is such that it comprises, consists, essentially consists of, in succession from the glass sheet, at least:
a first transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, said coating having an optical thickness of between 40.0 nm and 90.0 nm, a semi-transparent functional coating based on at least one compound selected from metals or nitrides, preferably based on at least one compound selected from titanium, silver, silver nitride, said silver nitride optionally being a subnitride, the nitrided or subnitrided silver optionally being preferred, the geometric thickness of said coating falling within the range of values from 2.0 nm to 20.0 nm, a second transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, the nitrides being preferred because their deposition causes few changes in the optical properties of the semi-transparent functional coating, said coating having an optical thickness of between 135.0 nm and 215.0 nm, a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the three preceding embodiments is a substrate, optionally toughened, suitable for use as a decorative facing panel for indoor or outdoor applications having color characteristics $L^*$, $a^*$, $b^*$ in the C.I.E.L.A.B system such that $38.5 \leq L^* \leq 52.5$, $-5.1 \leq a^* \leq -1.1$, $-32 \leq b^* \leq -26$, more particularly $L^*=45.5$, $a^*=-3.1$, $b^*=-29$ and measured according to the D65 illuminant at 10° in reflection on the side of the uncovered face of the glass sheet by an apparatus of the UltraScan type and a reflectance of between 9% and 19%, more particularly equal to 14%, measured according to the D65 illuminant at 2° in reflection of the side of the uncovered face of the glass sheet by an apparatus of the UltraScan type.

According to a particular embodiment, the substrate with interference coloration, the substrate being preferably monolithic, for a facing panel according to the invention is such that it comprises, consists, essentially consists of, in succession from the glass sheet, at least:

a coating improving the adhesion made from silicon oxynitride, the geometric thickness of the coating improving the adhesion being at least above 0.0 nm and at most 30.0 nm or less, preferably about 15.0 nm, a first transparent coating made from a dielectric material of silicon nitride, said coating having an optical thickness falling within the range of values from 31.8 nm to 101.0 nm, preferably about 66.4 nm, a semi-transparent functional coating made from silver, optionally subnitrided, the geometric thickness of said coating falling within the range of values from 4.2 nm to 6.4 nm preferably about 5.4 nm, a second transparent coating made from a dielectric material of silicon nitride, said coating having an optical thickness falling between the range of values from 162.8 nm to 195.4 nm, preferably about 181.6 nm, a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel, The substrate, optionally toughened, is suitable for use as a decorative facing panel for indoor or outdoor applications having color characteristics $L^*$, $a^*$, $b^*$ in the C.I.E.L.A.B system such that $38.5 \leq L^* \leq 52.5$, $-5.1 \leq a^* \leq -1.1$, $-32 \leq b^* \leq -26$, more particularly $L^*=45.5$, $a^*=-3.1$, $b^*=-29$ and measured according to the D65 illuminant at 10° in reflection on the side of the uncovered face of the glass sheet by an apparatus of the UltraScan type and a reflectance of between 9% and 19%, more particularly equal to 14%, measured according to the D65 illuminant at 2° in reflection of the side of the uncovered face of the glass sheet by an apparatus of the type; the colorimetric coordinates of said substrate being relatively independent of the observation angle. The expression "colorimetric coordinates of said substrate being relatively independent of the observation angle" means a variation on colorimetric coordinates $\Delta E^*$ equal to 10 or less, and for any observation angle from 0° to 55°.

According to a particular embodiment, the glass substrate with interference coloration, said substrate being preferably monolithic, for a facing panel according to the invention is such that it comprises, consists, essentially consists of, in succession from the glass sheet, at least:

a first transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, said coating having an optical thickness of between 8.0 nm and 60.0 nm, a semi-transparent functional coating based on at least one compound selected from metals or nitrides, preferably based on at least one compound selected from titanium, chromium, stainless steel, palladium, titanium nitride, stainless steel being preferred because of its mechanical and chemical stability, the geometric thickness of said coating falling within the range of values from 2.0 nm to 10.0 nm, a second transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, the nitrides being preferred because their deposition causes few changes in the optical properties of the semi-transparent functional coating, said coating having an optical thickness of between 130.0 nm and 220.0 nm, a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the three preceding embodiments is a substrate, optionally toughened, suitable for use as a decorative facing panel for indoor or outdoor applications having color characteristics $L^*$, $a^*$, $b^*$ in the C.I.E.L.A.B system such that $41.0 \leq L^* \leq 55.0$, $-5.3 \leq a^* \leq -1.3$, $-34.0 \leq b^* \leq -26.0$, more particularly $L^*=48.0$, $a^*=-3.3$, $b^*=-30.0$ and measured according to the D65 illuminant at 10° in reflection on the side of the uncovered face of the glass sheet by an apparatus of the UltraScan type and a reflectance of between 11.0% and 21.0%, more particularly equal to 16.0%, measured according to the D65 illuminant at 2° in reflection of the side of the uncovered face of the glass sheet by an apparatus of the UltraScan type.

According to a particular embodiment, the substrate with interference coloration, the substrate being preferably monolithic, for a facing panel according to the invention is such that it comprises, consists, essentially consists of, in succession from the glass sheet, at least:
  a coating improving the adhesion made from silicon oxynitride, the geometric thickness of the coating improving the adhesion being at least above 0.0 nm and at most 30.0 nm or less, preferably about 15.0 nm,
  a first transparent coating made from a dielectric material of silicon nitride, said coating having an optical thickness falling within the range of values from 2.8 nm to 26.0 nm, preferably about 14.4 nm,
  a semi-transparent functional coating made from stainless steel, the geometric thickness of said coating falling within the range of values from 3.3 nm to 4.9 nm preferably about 4.1 nm,
  a second transparent coating made from a dielectric material of silicon nitride, said coating having an optical thickness falling between the range of values from 160.0 nm to 195.8 nm, preferably about 178.0 nm,
  a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel,
  the substrate, optionally toughened, is suitable for use as a decorative facing panel for indoor or outdoor applications having color characteristics $L^*$, $a^*$, $b^*$ in the C.I.E.L.A.B system such that $41.0 \leq L^* \leq 55.0$, $-5.3 \leq a^* \leq -1.3$, $-34.0 \leq b^* \leq -26.0$, more particularly $L^*=48.0$, $a^*=-3.3$, $b^*=-30.0$ and measured according to the D65 illuminant at 10° in reflection on the side of the uncovered face of the glass sheet by an apparatus of the UltraScan type and a reflectance of between 11.0% and 21.0%, more particularly equal to 16.0%, measured according to the D65 illuminant at 2° in reflection of the side of the uncovered face of the glass sheet by an apparatus of the type; the colorimetric coordinates of said substrate being relatively independent of the observation angle. The expression "colorimetric coordinates of said substrate being relatively independent of the observation angle" means a variation on colorimetric coordinates $\Delta E^*$ equal to 10 or less, and for any observation angle from 0° to 55°.

According to a particular embodiment, the glass substrate with interference coloration, said substrate being preferably monolithic, for a facing panel according to the invention is such that it comprises, consists, essentially consists of, in succession from the glass sheet, at least:
  a first transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, said coating having an optical thickness of between 80.0 nm and 200.0 nm, when the semi-transparent functional coating is based on oxidized stainless steel, the optical thickness of the first transparent coating made from dielectric material is between 90 nm and 150 nm.
  a semi-transparent functional coating based on at least one compound selected from metals, nitrides, oxides, preferably based on at least one compound selected from copper, stainless steel optionally oxidized, iron oxide in the form of $Fe_2O_3$ and/or $Fe_3O_4$, titanium nitride, stainless steel optionally oxidized and titanium nitride, preferably oxidized stainless steel, being preferred due to their mechanical and chemical stability, the geometric thickness of the said coating falling within the range of values from 0.5 nm to 50.0 nm, when the semi-transparent functional coating is based on oxidized stainless steel, the geometric thickness of the said coating is between 10.0 nm and 40.0 nm,
  a second transparent coating made from dielectric material based on at least one compound selected from an oxide of at least one element selected from zinc, silicon, titanium, tin, aluminum, a mixed oxide of at least two of these elements, preferably mixed zinc-tin oxide, silicon nitride, an aluminum nitride, a mixed aluminum-silicon nitride, the nitrides being preferred because their deposition causes few changes in the optical properties of the semi-transparent functional coating when the semi-transparent functional coating is based on copper or titanium nitride, said second transparent coating having an optical thickness of between 100.0 nm and 300.0 nm, when the semi-transparent functional coating is based on oxidized stainless steel, iron oxide in the form of $Fe_2O_3$ and/or $Fe_3O_4$ the optical thickness of the second transparent coating is between 150.0 nm and 245.0 nm,
  a metallic coating providing the opacity or quasi-opacity of said stack, the geometric thickness of said coating providing the opacity or quasi-opacity being 100.0 nm or more, preferably falling within the range of values from 100.0 nm to 200.0 nm, more preferably about 200.0 nm, said coating providing the opacity or quasi-opacity comprising at least one metal, one metalloid, one nitride or one carbide, preferably said coating providing the opacity or quasi-opacity comprises at least one metal, preferably said metal is selected from chromium, titanium, stainless steel, nickel-chromium alloys.

According to a particular alternative of the preceding embodiment, the glass substrate with interference coloration for a facing panel according to the invention is such that it comprises, between the glass sheet and the first transparent coating made from dielectric material, at least one coating improving the adhesion made from a material having a refractive index at 550 nm of between 1.40 and 1.65 such as silicon oxynitride, the geometric thickness of the coating improving the adhesion being at least above 0.0 nm and at most 30.0 nm or less. Such a coating serves to increase the stability of the stack.

According to a particular alternative of the two preceding embodiments, the glass substrate with interference coloration for a facing panel according to the invention is such that it comprises, above the metallic coating providing the opacity or quasi-opacity, an overcoat, the material constituting said overcoat being based on a compound selected from carbon, silicon oxynitride, silicon nitride, silicon carbide, said overcoat having a geometric thickness of at least 5.0 nm or more and at most 50.0 nm or less.

The substrate according to any one of the three preceding embodiments is a substrate, optionally toughened, suitable for use as a decorative facing panel for indoor or outdoor applications having color characteristics $L^*$, $a^*$, $b^*$ in the C.I.E.L.A.B system such that $61.0 \leq L^* \leq 75.0$, $2.5 \leq a^* \leq 6.5$, $2.0 \leq b^* \leq 8.0$, more particularly $L^*=68.0$, $a^*=4.5$, $b^*=5.0$ and measured according to the D65 illuminant at 10° in reflection on the side of the uncovered face of the glass sheet by an apparatus of the UltraScan type and a reflectance of between 33% and 43%, more particularly equal to 38%, measured according to the D65 illuminant at 2° in reflection of the side of the uncovered face of the glass sheet by an apparatus of the UltraScan type.

According to a particular embodiment, the substrate with interference coloration, the substrate being preferably monolithic, for a facing panel according to the invention is such that it comprises, consists, essentially consists of, in succession from the glass sheet, at least:
- a coating improving the adhesion made from silicon oxynitride, the geometric thickness of the coating improving the adhesion being at least above 0.0 nm and at most 30.0 nm or less, preferably about 15.0 nm,
- a first transparent coating made from a dielectric material of silicon nitride, said coating having an optical thickness falling within the range of values from 102.8 nm to 132.4 nm, preferably about 122.6 nm,
- a semi-transparent functional coating made from stainless steel, the geometric thickness of said coating falling within the range of values from 23.8 nm to 35.8 nm preferably about 29.8 nm,
- a second transparent coating made from a dielectric material of silicon nitride, said coating having an optical thickness falling between the range of values from 120.5 nm to 232.1 nm, preferably about 193.6 nm,
- a metallic coating providing the opacity or quasi-opacity of said stack, the geometric thickness of said coating providing the opacity or quasi-opacity being at least 100.0 nm or more, preferably falling within the range of values from 100.0 nm to 200.0 nm, more preferably above 200.0 nm, said coating providing the opacity or quasi-opacity being made from stainless steel, the substrate, optionally toughened, is suitable for use as a decorative facing panel for indoor or outdoor applications having color characteristics $L^*$, $a^*$, $b^*$ in the C.I.E.L.A.B system such that such that $61.0 \leq L^* \leq 75.0$, $2.5 \leq a^* \leq 6.5$, $2.0 \leq b^* \leq 8.0$, more particularly $L^*$ 68.0, $a^*=4.5$, $b^*=5.0$ and measured according to the D65 illuminant at 10° in reflection on the side of the uncovered face of the glass sheet by an apparatus of the UltraScan type and a reflectance of between 33.0% and 43.0%, more particularly equal to 38.0%, measured according to the D65 illuminant at 2° in reflection of the side of the uncovered face of the glass sheet by an apparatus of the type; the colorimetric coordinates of said substrate being relatively independent of the observation angle. The expression "colorimetric coordinates of said substrate being relatively independent of the observation angle" means a variation on colorimetric coordinates $\Delta E^*$ equal to 6 or less, and for any observation angle from 0° to 55°.

A second object of the invention is a method for fabricating a glass substrate with interference coloration for a facing panel. The method for fabricating the glass substrate with interference coloration for a facing panel according to the invention comprises the following successive steps:
- deposition on a glass sheet of a first transparent dielectric coating by a magnetic field-assisted vacuum cathode sputtering technique, the optical thickness of the first transparent coating being at least 5.0 nm or more, preferably at least 10.0 nm or more, more preferably at least 20.0 nm or more, the most preferably at least 50.0 nm or more, preferably at least 70.0 nm or more, more preferably at least 100.0 nm or more, more preferably at least 110.0 nm or more and at most 258.0 nm or less, preferably at most 190.0 nm or less, more preferably at most 180.0 nm or less, the most preferably at most 150.0 nm or less, preferably at most 120.0 nm or less, preferably, the optical thickness falls within the range of values from 5.0 nm, preferably from 10.0 nm, more preferably from 20.0 nm to 258.0 nm, preferably from 50.0 nm to 190.0 nm, more preferably from 70.0 nm to 180.0 nm, the most preferably from 100.0 nm to 150.0 nm, preferably from 110.0 to 120.0 nm,
- deposition of a semi-transparent functional coating by a magnetic field-assisted vacuum cathode sputtering technique, the geometric thickness of the metallic functional coating being at least 0.1 nm or more, preferably at least 0.3 nm or more, more preferably at least 0.5 nm or more and at most 50.0 nm or less, preferably at most 25.0 nm or less, preferably the geometric thickness falling within the range of values from 0.1 nm and preferably from 0.3 nm to 50.0 nm, preferably from 0.5 nm to 25.0 nm, preferably the said semi-transparent functional coating having an absorbance of between 10% and 70%,
- deposition of a second transparent dielectric coating by a magnetic field-assisted vacuum cathode sputtering technique, the optical thickness of the second transparent coating being at least 20.0 nm or more, preferably at least 30.0 nm or more, more preferably at least 100.0 nm or more, the most preferably at least 150.0 nm or more, preferably 170.0 nm or more and at most 300.0 nm or less, preferably at most 250.0 nm or less, more preferably at most 210.0 nm or less, the most preferably at most 200.0 nm or less. Preferably the optical thickness falls within the range of values from 20.0 nm, preferably from 30.0 nm, more preferably from 100.0 nm to 300.0 nm, more preferably from 150.0 nm to 250.0 nm, the most preferably from 170.0 nm to 200.0 nm, deposition of a coating providing the metallic opacity or quasi-opacity of the said stack by a magnetic field-assisted vacuum cathode sputtering technique for depositing a metallic coating, the geometric thickness of the said coating providing the opacity or quasi-opacity being at least 30.0 nm or more, preferably at least 50.0 nm or more, more preferably at least 100.0 nm or more, the geometric thickness of the coating providing the opacity or quasi-opacity being at most 1000.0 nm or less, preferably at most 200.0 nm or less. Preferably, the geometric thickness of the said coating falls within the range of values from 30.0 nm to 1000.0 nm, preferably from 50.0 nm to 1000.0 nm, the most preferably from 100.0 nm to 200.0 nm.

A third object of the invention is the use of a glass substrate with interference coloration for a facing panel according to the invention as a facade facing panel or spandrel, preferably as a monolithic facade facing panel or spandrel. Other uses of this type of facing panel are also feasible, and mention can be made for example of reflecting products or even partially reflecting products, decorative products for indoor or outdoor use in the form, for example, of elements for a shelf, a cabinet, door, ceiling, support, glass table, bracket, partition, storefront, etc.

5. LIST OF FIGURES

The glass substrate with interference coloration for a facing panel according to the invention will now be illustrated with the help of the following figures. The figures provide a nonlimiting presentation of the number of structures of stacks of layers constituting the said glass substrate for a facing panel. These figures are purely illustrative and do not constitute a presentation to scale of the stack structures.

FIG. 1: Cross-section of a glass substrate with interference coloration for a facing panel according to the invention.

Figure 2:
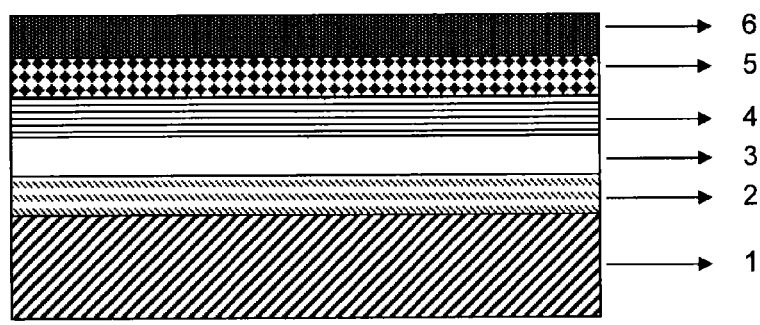

FIG. 2: Cross-section of a glass substrate with interference coloration for a facing panel according to the invention comprising a protective coating.

Figure 3:
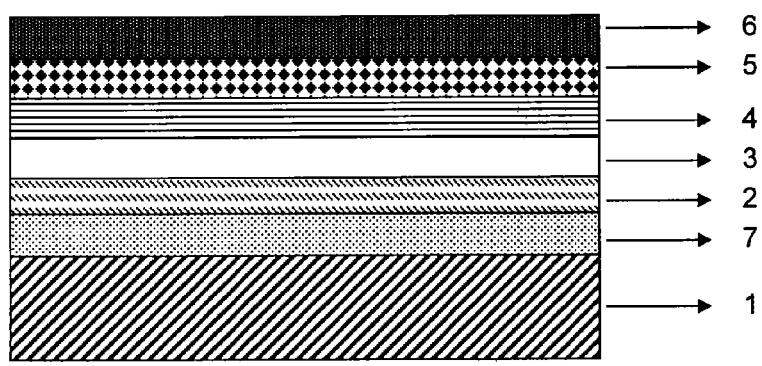

FIG. 3: Cross-section of a glass substrate with interference coloration for a facing panel according to the invention comprising a first transparent dielectric coating comprising two layers.

Figure 4:
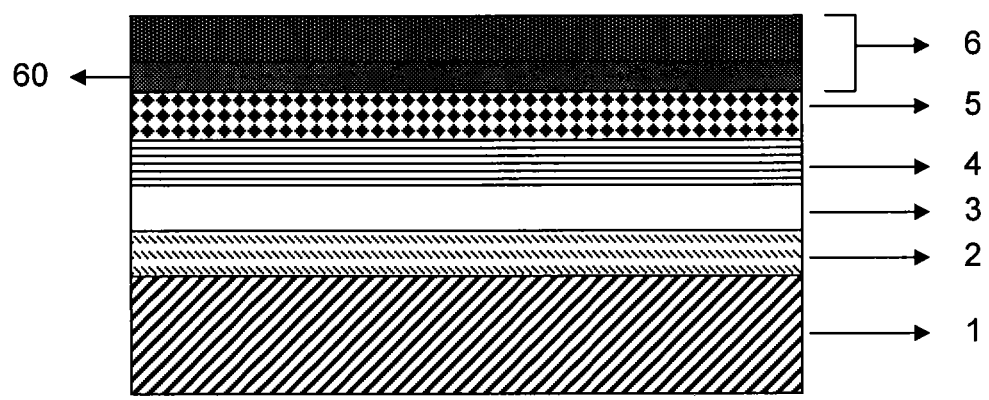

FIG. 4: Cross-section of a glass substrate with interference coloration for a facing panel according to the invention whereof the protective coating comprises an adhesive layer.

FIG. 1 shows an example of a stack constituting a glass substrate with interference coloration for a facing panel according to the invention. The glass substrate with interference coloration has the following structure from the glass sheet (1):
  a first transparent dielectric coating (2)
  a semi-transparent functional coating (3)
  a second transparent dielectric coating (4)
  a coating providing the opacity or quasi-opacity (5)

FIG. 2 shows an alternative example of a stack. The latter comprises, in addition to the coatings already shown in FIG. 1, a protective coating. The glass substrate with interference coloration has the following structure from the glass sheet (1):
  a first transparent dielectric coating (2)
  a semi-transparent functional coating (3)
  a second transparent dielectric coating (4)
  a coating providing the opacity or quasi-opacity (5)
  a protective coating (6)

FIG. 3 shows another example of a stack. The latter comprises, in addition to the coatings already present in FIG. 2, a first transparent dielectric coating comprising two layers. The glass substrate with interference coloration has the following structure from the glass sheet (1):
  a coating for improving the adhesion (7)
  a first transparent dielectric coating (2)
  a semi-transparent functional coating (3)
  a second transparent dielectric coating (4)
  a coating providing the opacity or quasi-opacity (5)
  a protective coating (6)

FIG. 4 shows an alternative example of a stack. The latter is distinguished from the structure described in FIG. 2 by the presence of a protective coating (6) comprising two layers including an adhesive layer (60). The glass substrate with interference coloration has the following structure from the glass sheet (1):
  a first transparent dielectric coating (2)
  a semi-transparent functional coating (3)
  a second transparent dielectric coating (4)
  a coating providing the opacity or quasi-opacity (5)
  a protective coating (6) comprising an adhesive layer (60).

6. DESCRIPTION OF AN EMBODIMENT OF THE INVENTION

The glass substrate with interference coloration for a facing panel according to the invention, its embodiment and its use as a facade facing panel or decorative reflective panel will now be characterized, with the help of exemplary embodiments described and resumed in the tables below. These examples are not at all limiting for the invention. The symbols SiON, SiN denote silicon oxynitride and silicon nitride, respectively.

Examples of a glass substrate according to the invention are presented in Table 1 below, the geometric thicknesses given in brackets are expressed in nanometers, the glass substrate presented being usable as a spandrel or as a reflecting decorative facing panel.

Table I: Examples of a stack of coatings of a glass substrate according to the invention. The thicknesses are geometric thicknesses. The glass substrate consists of a sheet of clear glass not colored in the mass.

TABLE I

| Ex | Coating improving the adhesion type/ thickness (nm) | First transparent dielectric coating type/ thickness (nm) | Semi- transparent functional coating type/ thickness (nm) | Second transparent dielectric coating type/ thickness (nm) | Coating providing the opacity type/ thickness (nm) |
|---|---|---|---|---|---|
| 1 | SiON/25.0 | SiN/55.0 | Stainless steel/3.6 | SiN/89.0 | Stainless steel/225.0 |
| 2 | SiON/15.0 | SiN/59.2 | Stainless steel/3.4 | SiN/97.0 | Stainless steel/200.0 |
| 3 | SiON/15.0 | SiN/57.1 | Stainless steel/3.8 | SiN/90.7 | Stainless steel/200.0 |
| 4 | SiON/15.0 | SiN/59.4 | Stainless steel/3.6 | SiN/86.6 | Stainless steel/200.0 |
| 5 | — | SiN/64.5 | Stainless steel/3.6 | SiN/116.2 | Stainless steel/200.0 |
| 6 | SiON/15.0 | SiN/62.9 | Stainless steel/3.8 | SiN/115.1 | Stainless steel/200.0 |
| 7 | SiON/15.0 | SiN/33.2 | Ag/5.4 | SiN/90.8 | Stainless steel/200.0 |
| 8 | SiON/15.0 | SiN/25.0 | Ag/3.5 | SiN/74.0 | Stainless steel/200.0 |
| 9 | SiON/15.0 | SiN/59.0 | Stainless steel/3.7 | SiN/101.0 | Stainless steel/200.0 |
| 10 | SiON/30.0 | SiN/56.8 | Stainless steel/3.3 | SiN/93.7 | Stainless steel/200.0 |

TABLE I-continued

| Ex | Coating improving the adhesion type/ thickness (nm) | First transparent dielectric coating type/ thickness (nm) | Semi- transparent functional coating type/ thickness (nm) | Second transparent dielectric coating type/ thickness (nm) | Coating providing the opacity type/ thickness (nm) |
|---|---|---|---|---|---|
| 11 | SiON/15.0 | SiN/56.4 | Stainless steel/3.3 | SiN/92.3 | Stainless steel/200.0 |
| 12 | SiON/15.0 | SiN/45.6 | Stainless steel/4.96 | SiN/94.3 | Stainless steel/150.0 |

Table II shows the conditions under which the successive depositions have been made on a clear glass sheet not colored in the mass and corresponding to example 9 resumed in Table I. These deposits were made by magnetron sputtering in a laboratory installation.

TABLE II

| Layer- geometric thickness (nm) | No. of passages * Conveyor speed (cm/min) | Power applied to the cathode (kW) | Ar (sccm) | N$_2$ (sccm) | O$_2$ (sccm) | P (Pa) |
|---|---|---|---|---|---|---|
| SiON | 15.0 | 1 * 68.58 | 2.0 | 49 | 7 | 10 | 0.3 |
| SiN | 59.0 | 2 * 66.04 | 4.0 | 40 | 53 | — | 0.4 |
| Stainless steel | 3.7 | 1 * 340.36 | 0.5 | 75 | — | — | 0.4 |
| SiN | 101.0 | 3 * 58.42 | 4.0 | 40 | 53 | — | 0.4 |
| Stainless steel | 200.0 | 2 * 71.12 | 3.0 | 75 | — | — | 0.4 |

Example 9 resumed in Table II meets standards ISO12543-4, ISO10545-13, ASTM G53-88 (UV 1000 hours) in terms of chemical behavior properties. Moreover, good adhesion of the stack of coatings to the substrate is the important factor. In order to qualify this adhesion, we have redefined an adhesion test, called AWRT test, which is performed as follows:

A circular flat Teflon head covered with a cotton fabric is dragged on the layer with a constant and integrated load. The area of the layer covered by the friction of the fabric (reference: CODE 40700004 supplied by ADSOL) is 2.81 cm² and the load applied is 3.850 g. The abrasion on the cotton on the coated surface will damage (or remove) the stack of coatings after a number of cycles (250 cycles, preferably 500 cycles). The cotton must be kept wet with deionized water throughout the test. The speed must be adjusted between 60 and 90 complete oscillations (two-way) per minute. The test is applied to determine the threshold at which the layer is discolored and/or the threshold at which scratches appear in the stack of coatings. A sample is observed under artificial light to determine whether a discoloration or scratches can be seen on the sample. No delamination must be identified for the test to be successful.

Table III shows the variation in colorimetric coordinates expressed in the system L*, a*, b* of the facing panel with interference coloration according to the invention of Example 1 and Example 10 presented in Table I during the toughening process. The facing panel with interference coloration according to the invention is toughened in a furnace, the said furnace being preheated to a temperature of at least over 600° C., preferably to a temperature of 670° C. The facing panel is toughened during a time interval ranging from 7 minutes to 15 minutes, the parameters L*$_{tv,\alpha}$, a*$_{tv,\alpha}$, b*$_{tv,\alpha}$ are measured as a function of toughening time. The parameters L*, a*, b* are measured with an "ULTRASCAN" apparatus with a source corresponding to the CIE standard D65 "daylight" illuminant and at a solid angle of 10°. The colorimetric coordinates L*, a*, b* measured after toughening are very slightly affected by the toughening process (toughening time). In fact, it is observed that the variation of these values expressed in the form of $\Delta E^*_{v,\alpha}$ with $$\Delta E^*_{v,\alpha} = \sqrt{(L^*_{t,v,\alpha,7\ min,670°\ C.} - L^*_{t,v,\alpha,tps,t°})^2 + (a^*_{t,v,\alpha,7\ min,670°\ V,\alpha} - a^*_{t,v,\alpha,tps,t°})^2 + (b^*_{t,v,\alpha,7\ min,670°\ C.} - b_{t,v,\alpha,tps,t°})^2}$$

where L*$_{t,v,\square\square 7\ min.,670°\ C.}$, a*$_{t,v,\square\square 7\ min.,670°\ C.}$, b*$_{t,v,\square\square 7\ min.,670°\ C.}$ represent the colorimetric coordinates L*, a*, b* of the glass substrate with interference coloration for a facing panel after 7 minutes of toughening at a temperature of 670° C. and L*$_{t,v,\square\square tps,t°}$, a*$_{t,v,\square\square tps,t°}$ and b*$_{t,v\ \square\square tps,t°}$ represent respectively the colorimetric coordinates L*, a*, b* after a toughening treatment on the same glass substrate with interference coloration for a facing panel during a time tps at a temperature of t°.

TABLE III

| L* | a* | B* | Toughening time (min) | $\Delta E_{tv,\alpha*}$ |
|---|---|---|---|---|
| Facing panel with interference coloration presented in Table I, Example 1 | | | | |
| 47.64 | −1.47 | −13.64 | 0 | 3.70 |
| 47.52 | −1.79 | −9.94 | 7 | 0.00 |
| 47.70 | −1.81 | −10.04 | 9 | 0.20 |
| 47.42 | −1.68 | −9.37 | 11 | 0.59 |
| 47.70 | −1.61 | −9.50 | 13 | 0.51 |
| 48.52 | −1.64 | −9.89 | 15 | 1.01 |
| Facing panel with interference coloration presented in Table I, Example 10 | | | | |
| 50.59 | −0.15 | −14.81 | 0 | 3.95 |
| 50.36 | −0.21 | −10.87 | 7 | 0.00 |
| 50.32 | −0.44 | −10.45 | 11 | 0.48 |
| 50.47 | −0.51 | −10.39 | 15 | 0.58 |

Tables IV, V, VI, VII and VIII show the simulation of the colorimetric coordinates expressed in the system L*, a*, b* as a function of the observation angle for glass substrates for a facing panel, examples 2, 3, 4, 11, 12 of Table I according to the invention. These properties are compared to those of the various laminated glazings sold by AGC (Table IV: Stopray Vision-50T IGU, Table V: Stopray Vision-60T IGU, Table VI: Planibel Energy NT IGU, Table VII: Stopray Galaxy IGU, Table VIII: Stopray Ultravision 50 IGU). The term IGU denotes the "double glazing" structure formed from the sun side face of a first clear glass sheet 6 mm thick and a second clear glass sheet 4 mm thick, the distance between the two sheets being 16 mm, the atmosphere trapped in the space between the two sheets consisting of 90% argon, the first glass sheet being a sheet with a layer of the type Stopray Vision- 50T, Stopray Vision-60T, Planibel Energy NT IGU, Stopray Ultravision 50 IGU, the layer being located on the inner phase of the double glazing (position P2 as commonly referred to by the person skilled in the art). The glass sheets constituting the laminated glazing and the facing panel with interference coloration according to the invention have the same chemical composition. The coordinates L*, a* and b* of the laminated glazings were measured with a "SPETRASCAN" apparatus using a source corresponding to the CIE standard D65 "daylight" illuminant and at a solid angle of 10°. These simulations of the glass substrates according to the invention were made using the CODE program developed by W Theis Coating designer 3.16. $\Delta E^*_{i,\alpha}$ represents the difference of the colorimetric coordinates with $\Delta E^*_{i,\alpha} = \sqrt{(\Delta L^*_{i,\alpha})^2 + (\Delta a^*_{i,\alpha})^2 + (\Delta b^*_{i,\alpha})^2}$ as a function of the angle $\alpha$, where $\Delta L^*_{i,\alpha}$ represents the difference between the colorimetric coordinates $L^*_{i,\alpha}$ of an opaque zone consisting of the glass substrate with interference coloration for a facing panel obtained by simulation and a viewing zone corresponding to a laminated glazing measured, $\Delta a^*_{i,\alpha}$ represents the difference between the colorimetric coordinates $a^*_{i,\alpha}$ of an opaque zone consisting of the glass substrate with interference coloration for a facing panel obtained by simulation and a viewing zone corresponding to a laminated glazing measured, $\Delta b^*_{i,\alpha}$ represents the difference between the colorimetric coordinates $b^*_{i,\alpha}$ of an opaque zone consisting of the glass substrate with interference coloration for a facing panel obtained by simulation and a viewing zone corresponding to a laminated glazing measured.

TABLE IV

| Measurement angle (°) | Stopray Vision-50T IGU Laminated Glazing | | | Facing panel with interference coloration (ex. 2, Table I) | | | $\Delta E^*_{i,\alpha}$ |
|---|---|---|---|---|---|---|---|
| | L* | a* | b* | L* | a* | b* | |
| 8.5 | 51.02 | −1.11 | −9.82 | 51.80 | −0.30 | −10.70 | 3.11 |
| 15.0 | 51.25 | −1.18 | −9.90 | 51.67 | −0.50 | −10.30 | 3.35 |
| 25.0 | 50.63 | −1.26 | −9.37 | 51.31 | −1.20 | −9.50 | 3.20 |
| 35.0 | 50.05 | −1.29 | −8.63 | 50.93 | −1.99 | −8.44 | 2.71 |
| 45.0 | 50.98 | −1.14 | −8.15 | 50.85 | −2.80 | −7.50 | 1.61 |
| 55.0 | 54.72 | −0.83 | −7.73 | 51.76 | −3.19 | −6.84 | 3.89 |

TABLE V

| Measurement angle (°) | Stopray Vision-60T IGU Laminated Glazing | | | Facing panel with interference coloration (ex. 3, Table I) | | | $\Delta E^*_{i,\alpha}$ |
|---|---|---|---|---|---|---|---|
| | L* | a* | b* | L* | a* | b* | |
| 8.5 | 45.51 | −1.48 | −10.41 | 47.30 | −1.50 | −10.30 | 1.79 |
| 15.0 | 45.31 | −1.71 | −10.15 | 47.16 | −1.70 | −10.00 | 1.85 |
| 25.0 | 44.97 | −2.37 | −9.58 | 46.78 | −2.30 | −9.40 | 1.82 |
| 35.0 | 44.99 | −3.23 | −9.00 | 46.40 | −2.97 | −8.76 | 1.46 |
| 45.0 | 46.43 | −4.19 | −8.72 | 46.40 | −3.40 | −8.30 | 0.89 |
| 55.0 | 50.42 | −4.65 | −8.40 | 47.66 | −3.41 | −7.75 | 3.10 |
| 65.0 | 58.74 | −4.21 | −6.66 | 52.00 | −2.62 | −6.55 | 6.93 |

TABLE VI

| Measurement angle (°) | Planibel Energy NT IGU Laminated Glazing | | | Facing panel with interference coloration (ex. 4, Table I) | | | $\Delta E^*_{i,\alpha}$ |
|---|---|---|---|---|---|---|---|
| | L* | a* | b* | L* | a* | b* | |
| 8.5 | 43.97 | −1.10 | −6.49 | 45.80 | −1.50 | −6.60 | 1.88 |
| 15.0 | 44.01 | −1.48 | −6.23 | 45.71 | −1.80 | −6.30 | 1.73 |
| 25.0 | 43.81 | −2.30 | −5.51 | 45.47 | −2.40 | −5.80 | 1.69 |
| 35.0 | 44.09 | −3.32 | −5.10 | 45.30 | −3.10 | −5.29 | 1.24 |
| 45.0 | 45.58 | −3.95 | −5.48 | 45.54 | −3.60 | −5.10 | 0.52 |
| 55.0 | 49.92 | −3.53 | −6.53 | 47.06 | −3.51 | −5.05 | 3.22 |
| 65.0 | 58.00 | −2.30 | −5.68 | 51.66 | −2.66 | −4.51 | 6.46 |

TABLE VII

| Measurement angle (°) | Stopray Galaxy IGU Laminated Glazing | | | Facing panel with interference coloration (ex. 11, Table I) | | | $\Delta E^*_{i,\alpha}$ |
|---|---|---|---|---|---|---|---|
| | L* | a* | b* | L* | a* | b* | |
| 8.5 | 50.48 | −1.77 | −7.71 | 51.10 | −2.30 | −7.70 | 0.82 |
| 15.0 | 50.04 | −1.95 | −7.43 | 50.96 | −2.50 | −7.50 | 1.07 |
| 25.0 | 49.83 | −2.52 | −6.98 | 50.61 | −3.00 | −7.10 | 0.93 |
| 35.0 | 49.53 | −3.38 | −6.36 | 50.25 | −3.62 | −6.83 | 0.89 |
| 45.0 | 50.29 | −4.45 | −6.48 | 50.16 | −4.00 | −6.70 | 0.52 |
| 55.0 | 52.41 | −5.53 | −7.42 | 51.08 | −3.98 | −6.67 | 2.04 |
| 65.0 | 56.82 | −5.80 | −7.88 | 54.67 | −3.15 | −6.00 | 3.89 |

TABLE VIII

| Measurement angle (°) | Stopray Ultravision 50 IGU Laminated Glazing | | | Facing panel with interference coloration (ex. 12, Table I) | | | $\Delta E^*_{i,\alpha}$ |
|---|---|---|---|---|---|---|---|
| | L* | a* | b* | L* | a* | b* | |
| 8.5 | 49.63 | −4.87 | −15.31 | 50.30 | −4.90 | −15.70 | 0.77 |
| 15.0 | 48.62 | −5.10 | −14.48 | 50.11 | −5.65 | −13.32 | 1.97 |
| 25.0 | 48.86 | −5.70 | −14.10 | 49.39 | −5.63 | −13.55 | 0.77 |
| 35.0 | 48.65 | −6.38 | −13.25 | 48.52 | −5.53 | −13.79 | 1.02 |
| 45.0 | 48.82 | −6.73 | −12.84 | 47.94 | −5.26 | −13.85 | 1.99 |
| 55.0 | 50.32 | −6.14 | −13.38 | 48.60 | −4.61 | −13.23 | 2.30 |

Table IX shows the colorimetric coordinates of Examples 5, 6, 7 before toughening and the variation in the colorimetric coordinates of Examples 5 and 7 before and after toughening. The toughening time is about 7 minutes at a temperature of about 670°. The glass substrate consists of a sheet of clear glass not colored in the mass.

TABLE IX

| Example | toughening | L* | a* | b* | $\Delta E^*_{v,\alpha}$ |
|---|---|---|---|---|---|
| 5 | before | 59.43 | −3.41 | −10.7 | 1.64 |
| | after | 59.06 | −1.84 | −11.0 | |
| 6 | before | 58.54 | −3.35 | −12.7 | |
| 7 | before | 45.1 | −3.24 | −29.9 | 9.27 |
| | after | 38.3 | 1.74 | −33.7 | |

It may be observed that Example 5 can be used as a spandrel. Example 7, despite the variations in its colorimetric coordinates after the thermal toughening treatment, can be used both as a spandrel and as a facing panel not requiring thermal toughening, or even as a facing panel which can be toughened. This type of panel can be used in the form of reflecting products, or partially reflecting products, decorative products for indoor or outdoor use in the form, for example, of elements for a shelf, a cabinet, door, ceiling, support, glass table, bracket, partition, storefront, etc.

Table X shows examples of a panel of the examples of a glass substrate according to the invention which can be used as a spandrel combined with a laminated glazing of the Stopray Vision-50T type, the geometric thicknesses given in brackets are expressed in nanometers, the glass substrate presented can be used as a spandrel or as a reflecting decorative facing panel. The glass substrate consists of a sheet of clear glass not colored in the mass. The symbol ZSO9 represents a mixed zinc-tin oxide containing 10% by weight of tin compared to the total weight of the zinc and tin metals.

TABLE X

| Ex | Coating improving the adhesion type/ thickness (nm) | First transparent dielectric coating type/ thickness (nm) | Semi-transparent functional coating type/ thickness (nm) | Second transparent dielectric coating type/ thickness (nm) | Coating providing the opacity type/ thickness (nm) |
|---|---|---|---|---|---|
| 13 | SiON/15.0 | SiN/59.2 | Stainless steel/3.4 | SiN/97.0 | Stainless steel/200.0 |
| 14 | SiON/15.0 | SiN/58.2 | Ti/4.5 | SiN/95.9 | Stainless steel/200.0 |
| 15 | SiON/15.0 | SiN/53.6 | Pd/2.0 | SiN/95.9 | Stainless steel/200.0 |
| 16 | SiON/15.0 | SiN/46.9 | Cr/2.2 | SiN/66.4 | Stainless steel/200.0 |
| 17 | SiON/15.0 | ZSO9/47.1 | Stainless steel/2.0 | ZSO9/47.2 | Stainless steel/200.0 |
| 18 | SiON/15.0 | ZSO9/36.6 | Pd/1.0 | ZSO9/64.2 | Stainless steel/200.0 |
| 19 | SiON/15.0 | ZnO/44.1 | Stainless steel/1.9 | ZnO/47.8 | Stainless steel/200.0 |
| 20 | SiON/30.0 | SiN/56.8 | Stainless steel/3.3 | SiN/93.7 | Stainless steel/200.0 |

Table XI shows the colorimetric coordinates of Example 20 of Table X before toughening and after toughening. The toughening time varies between 7 and 15 minutes at a temperature of about 670° C. The glass substrate consists of a sheet of clear glass not colored in the mass, the value $\Delta E_{v,\alpha}$ is given with regard to the colorimetric coordinates L*, a*, b* measured after the toughening time of 7 minutes.

TABLE XI

| Toughening time (minutes) | L* | a* | b* | $\Delta E_{v,\alpha}$ |
|---|---|---|---|---|
| 0 | 50.59 | −0.15 | −14.81 | 3.95 |
| 7 | 50.26 | −0.21 | −10.87 | 0.00 |
| 11 | 50.32 | −0.44 | −10.45 | 0.48 |
| 15 | 50.47 | −0.51 | −10.39 | 0.56 |

It may be observed that Example 20 can be used as a spandrel combined with a laminated glazing of the Stopray Vision-50T type because of the slight variation in its colorimetric coordinates during the thermal toughening treatment.

Table XII shows examples of a glass substrate according to the invention which can be used as a spandrel combined with a laminated glazing of the Stopray Vision-36T type sold by AGC, the geometric thicknesses in brackets are expressed in nanometers, the glass substrate presented can be used as a spandrel or as a reflecting decorative facing panel. The glass substrate consists of a sheet of clear glass not colored in the mass. The symbol ZSO9 represents a mixed zinc-tin oxide containing 10% by weight of tin in comparison with the total weight of zinc containing metals.

TABLE XII

| Ex | Coating improving the adhesion type/ thickness (nm) | First transparent dielectric coating type/ thickness (nm) | Semi-transparent functional coating type/ thickness (nm) | Second transparent dielectric coating type/ thickness (nm) | Coating providing the opacity type/ thickness (nm) |
|---|---|---|---|---|---|
| 21 | SiON/15.0 | SiN/38.7 | Stainless steel/0.7 | SiN/66.6 | Stainless steel/200.0 |
| 22 | SiON/15.0 | SiN/38.3 | Ti/0.9 | SiN/66.7 | Stainless steel/200.0 |
| 23 | SiON/15.0 | SiN/29.8 | Pd/0.46 | SiN/79.5 | Stainless steel/200.0 |
| 24 | SiON/15.0 | SiN/35.3 | Cr/0.94 | SiN/77.7 | Stainless steel/200.0 |
| 25 | SiON/15.0 | ZSO9/41.1 | Stainless steel/0.71 | ZSO9/60.0 | Stainless steel/200.0 |
| 26 | SiON/15.0 | ZSO9/31.4 | Pd/0.44 | ZSO9/73.5 | Stainless steel/200.0 |
| 27 | SiON/15.0 | ZnO/41.4 | Stainless steel/0.72 | ZnO/59.6 | Stainless steel/200.0 |
| 28 | SiON/15.0 | SiN/36.5 | Stainless steel/0.43 | SiN/68.7 | Stainless steel/200.0 |

Table XIII show the simulation of the colorimetric coordinates expressed in the system L*, a*, b* as a function of the observation angle for glass substrates for a facing panel, example 21 of Table XII, according to the invention. These properties are compared to those of a laminated glazing of the Stopray Vision-36T type sold by AGC. The glass sheets constituting the laminated glazing and the facing panel with interference coloration according to the invention have the same chemical composition. The coordinates L*, a* and b* of the laminated glazings were measured with a "SPETRASCAN" apparatus using a source corresponding to the CIE standard D65 "daylight" illuminant and at a solid angle of 10°. These simulations of the glass substrates according to the invention were made using the CODE program developed by W Theis Coating designer 3.16. $\Delta E^*_{i,\alpha}$ represents the difference of the colorimetric coordinates with $\Delta E^*_{i,\alpha} = \sqrt{(\Delta L^*_{i,\alpha})^2 + (\Delta a^*_{i,\alpha})^2 + (\Delta b^*_{i,\alpha})^2}$ as a function of the angle $\alpha$, where $\Delta L^*_{i,\alpha}$ represents the difference between the colorimetric coordinates $L^*_{i,\alpha}$ of an opaque zone consisting of the glass substrate with interference coloration for a facing panel obtained by simulation and a viewing zone corresponding to a laminated glazing measured, $\Delta a^*_{i,\alpha}$ represents the difference between the colorimetric coordinates $a^*_{i,\alpha}$ of an opaque zone consisting of the glass substrate with interference coloration for a facing panel obtained by simulation and a viewing zone corresponding to a laminated glazing measured, $\Delta b^*_{i,\alpha}$ represents the difference between the colorimetric coordinates $b^*_{i,\alpha}$ of an opaque zone consisting of the glass substrate with interference coloration for a facing panel obtained by simulation and a viewing zone corresponding to a laminated glazing measured.

TABLE XIII

| Measurement angle (°) | Stopray Vision-36T IGU Laminated Glazing | | | Facing panel with interference coloration (ex. 21, Table XII) | | | $\Delta E^*_{i,\alpha}$ |
|---|---|---|---|---|---|---|---|
| | L* | a* | b* | L* | a* | b* | |
| 8.5 | 61.17 | −3.70 | −8.88 | 63.70 | −3.90 | −8.20 | 2.63 |
| 15.0 | 63.53 | −3.93 | −10.21 | 63.51 | −3.90 | −8.40 | 1.81 |
| 25.0 | 62.32 | −4.06 | −9.72 | 63.07 | −3.70 | −6.70 | 1.31 |
| 35.0 | 62.02 | −4.22 | −9.42 | 62.50 | −3.42 | −9.15 | 0.97 |

TABLE XIII-continued

| Measurement angle (°) | Stopray Vision-36T IGU Laminated Glazing | | | Facing panel with interference coloration (ex. 21, Table XII) | | | $\Delta E^*_{i,\alpha}$ |
|---|---|---|---|---|---|---|---|
| | L* | a* | b* | L* | a* | b* | |
| 45.0 | 62.52 | −4.27 | −9.05 | 62.03 | −3.00 | −9.40 | 1.41 |
| 55.0 | 64.05 | −4.09 | −8.11 | 62.14 | −2.45 | −9.09 | 2.71 |

Table XIV shows the colorimetric coordinates of Example 28 of Table XII before toughening and after toughening. The toughening time varies between 7 and 15 minutes at a temperature of about 670° C. The glass substrate consists of a sheet of clear glass not colored in the mass, the value $\Delta E_{v,\alpha}$ is given with regard to the colorimetric coordinates L*, a*, b* measured after the toughening time of 7 minutes.

TABLE XIV

| Toughening time (minutes) | L* | a* | b* | $\Delta E_{v,\alpha}$ |
|---|---|---|---|---|
| 0 | 67.40 | −4.53 | −5.78 | 1.69 |
| 7 | 66.45 | −4.20 | −7.10 | 0.00 |
| 11 | 66.67 | −4.10 | −7.46 | 0.43 |
| 15 | 66.80 | −4.14 | −7.35 | 0.43 |

It may be observed that example 28 can be used as a spandrel combined with a laminated glazing of the Stopray Vision-50T type because of the slight variation in its colorimetric coordinates during the thermal toughening treatment.

Table XV shows examples of a glass substrate according to the invention which can be used as a spandrel combined with a laminated glazing of the Stopray Neo type sold by AGC, the geometric thicknesses in brackets are expressed in nanometers, the glass substrate presented can be used as a spandrel or as a reflecting decorative facing panel. The glass substrate consists of a sheet of clear glass not colored in the mass. The symbol ZSO9 represents a mixed zinc-tin oxide containing 10% by weight of tin in comparison with the total weight of zinc containing metals.

TABLE XV

| Ex | Coating improving the adhesion type/ thickness (nm) | First transparent dielectric coating type/ thickness (nm) | Semi- transparent functional coating type/ thickness (nm) | Second transparent dielectric coating type/ thickness (nm) | Coating providing the opacity type/ thickness (nm) |
|---|---|---|---|---|---|
| 29 | SiON/15.0 | SiN/71.2 | Stainless steel/5.6 | SiN/23.1 | Stainless steel/200.0 |
| 30 | SiON/15.0 | SiN/65.2 | Ti/3.9 | SiN/27.6 | Stainless steel/200.0 |
| 31 | SiON/15.0 | SiN/86.5 | Pd/6.7 | SiN/28.5 | Stainless steel/200.0 |
| 32 | SiON/15.0 | SiN/88.4 | Cr/6.4 | SiN/33.6 | Stainless steel/200.0 |
| 33 | SiON/15.0 | ZSO9/73.2 | Stainless steel/8.7 | ZSO9/21.4 | Stainless steel/200.0 |
| 34 | SiON/15.0 | ZSO9/83.0 | Pd/6.4 | ZSO9/27.6 | Stainless steel/200.0 |
| 35 | SiON/15.0 | ZnO/75.3 | Stainless steel/8.3 | ZnO/22.8 | Stainless steel/200.0 |
| 36 | SiON/15.0 | SiN/59.5 | Stainless steel/2.5 | SiN/102.5 | Stainless steel/200.0 |

Tables XVI and XVII show respectively the simulation of the variation show the simulation of the colorimetric coordinates expressed in the system L*, a*, b* as a function of the observation angle for glass substrates for a facing panel, example 29 of Table XV and example 36 of Table XV, according to the invention. These properties are compared to those of a laminated glazing of the Stopray Neo type sold by AGC. The glass sheets constituting the laminated glazing and the facing panel with interference coloration according to the invention have the same chemical composition. The coordinates L*, a* and b* of the laminated glazings were measured with a "SPE-TRASCAN" apparatus using a source corresponding to the CIE standard D65 "daylight" illuminant and at a solid angle of 10°. These simulations of the glass substrates according to the invention were made using the CODE program developed by W Theis Coating designer 3.16. $\Delta E^*_{i,\alpha}$ represents the difference of the colorimetric coordinates with $\Delta E^*_{i,\alpha} = \sqrt{(\Delta L^*_{i,\alpha})^2 + (\Delta a^*_{i,\alpha})^2 + (\Delta b^*_{i,\alpha})^2}$ as a function of the angle α, where $\Delta L^*_{i,\alpha}$ represents the difference between the colorimetric coordinates $L^*_{i,\alpha}$ of an opaque zone consisting of the glass substrate with interference coloration for a facing panel obtained by simulation and a viewing zone corresponding to a laminated glazing measured, $\Delta a^*_{i,\alpha}$ represents the difference between the colorimetric coordinates $a^*_{i,\alpha}$ of an opaque zone consisting of the glass substrate with interference coloration for a facing panel obtained by simulation and a viewing zone corresponding to a laminated glazing measured, $\Delta b^*_{i,\alpha}$ represents the difference between the colorimetric coordinates $b^*_{i,\alpha}$ of an opaque zone consisting of the glass substrate with interference coloration for a facing panel obtained by simulation and a viewing zone corresponding to a laminated glazing measured.

TABLE XVI

| Measurement angle (°) | Stopray Neo IGU Laminated Glazing | | | Facing panel with interference coloration (ex. 29, Table XV) | | | $\Delta E^*_{i,\alpha}$ |
|---|---|---|---|---|---|---|---|
| | L* | a* | b* | L* | a* | b* | |
| 8.5 | 56.87 | −1.77 | −5.57 | 56.90 | −1.80 | −5.00 | 0.57 |
| 15.0 | 56.55 | −1.72 | −5.59 | 56.87 | −1.70 | −5.10 | 0.59 |
| 25.0 | 56.06 | −1.49 | −5.58 | 56.72 | −1.40 | −5.20 | 0.77 |
| 35.0 | 56.22 | −1.31 | −5.42 | 56.63 | −1.10 | −5.26 | 0.49 |
| 45.0 | 57.16 | −1.08 | −4.63 | 56.81 | −0.70 | −5.10 | 0.70 |
| 55.0 | 60.00 | −1.24 | −2.91 | 57.83 | −0.28 | −4.46 | 2.84 |

TABLE XVII

| Measurement angle (°) | Stopray Neo IGU Laminated Glazing | | | Facing panel with interference coloration (ex. 36, Table XV) | | | $\Delta E^*_{i,\alpha}$ |
|---|---|---|---|---|---|---|---|
| | L* | a* | b* | L* | a* | b* | |
| 8.5 | 56.87 | −1.77 | −5.57 | 57.50 | −0.30 | −6.50 | 1.84 |
| 15.0 | 56.55 | −1.72 | −5.59 | 57.36 | −0.60 | −6.10 | 1.48 |
| 25.0 | 56.06 | −1.49 | −5.58 | 57.12 | −1.20 | −5.40 | 1.12 |
| 35.0 | 56.22 | −1.31 | −5.42 | 56.86 | −1.99 | −4.53 | 1.29 |
| 45.0 | 57.16 | −1.08 | −4.63 | 56.80 | −2.90 | −3.90 | 2.00 |
| 55.0 | 60.00 | −1.24 | −2.91 | 57.42 | −3.44 | −3.60 | 3.47 |

Examples of a glass substrate according to the invention are also shown in Table XVIII below, the geometrical thicknesses given in brackets are expressed in nanometers.

TABLE XVIII

Examples of a stack of coatings of a glass substrate according to the invention. The glass substrate consists of a sheet of clear glass not colored in the mass. The presentation of the X/Y type indicates from the glass a first layer of material X followed by a second layer of material Y.

| Coat improving the adhesion of diel. mat. 0-30 nm | 1st transp. diel. coat. Stricto senso (geom. th.: 10 nm-120 nm) | Semi-transp. funct. coat. geo. th.: 1 nm-25 nm | 2nd transp. diel. coat. geo. th.: 40 nm-120 nm | Coat. providing opacity geo. th.: 90 nm-200 nm | Protect. coat. geo. th.: 20 nm-200 nm |
|---|---|---|---|---|---|
| SiON | SiN | Ti | SiN | Ti | SiN |
| — | SiN | Ti | SiN | Ti | SiN |
| — | SiON | Ti | SiON | Ti | SiON |
| SiON | SiN | Ti | SiN | Ti | SiN/stainless steel |
| SiON | SiN | Ti | SiN | Ti | SiN/NiCrAlY |
| SiON | SiN | Ti | SiN | Ti | SiON |
| SiON | SiN | Ti | SiN | Ti | Stainless steel |
| SiON | SiN | Ti | SiN | Ti | Stainless steel/SiN |
| SiON | SiN | Ti | SiN | Ti | Cr/Stainless steel |
| SiON | SiN | Ti | SiN | Ti | NiCrAlY |
| SiON | SiN | Ti | SiN | Ti | NiCrAlY/SiN |
| $SiO_2$ | SiN | Ti | SiN | Ti | Stainless steel |
| $SiO_2$ | SiN | Ti | SiN | Ti | Cr/stainless steel |
| SiON | SiN | Ti | SiN | Ti | CrNiCrAlY |
| $SiO_2$ | SiON | Ti | SiON | Ti | SiON/stainless steel |
| $SiO_2$ | SiON | Ti | SiON | Ti | SiON/NiCrAlY |
| $SiO_2$ | SiON | Ti | SiON | Ti | Stainless steel |
| $SiO_2$ | SiON | Ti | SiON | Ti | Stainless steel/SiON |
| $SiO_2$ | SiON | Ti | SiON | Ti | Cr/Stainless steel |
| $SiO_2$ | SiON | Ti | SiON | Ti | Cr/Stainless steel/SiON |
| $SiO_2$ | SiON | Ti | SiON | Ti | NiCrAlY |
| $SiO_2$ | SiON | Ti | SiON | Ti | NiCrAlY/SiON |
| $SiO_2$ | SiON | Ti | SiON | Ti | Cr/NiCrAlY |
| $SiO_2$ | SiON | Ti | SiN | Cr | Stainless steel |
| $SiO_2$ | SiN | Al | SiN | Cr | Stainless steel |
| $SiO_2$ | SiN | Ag | SiN | Cr | Stainless steel |
| $SiO_2$ | SiN | Y | SiN | Cr | Stainless steel |
| $SiO_2$ | SiN | NiCr | SiN | Cr | Stainless steel |
| $SiO_2$ | SiN | Ta | SiN | Cr | Stainless steel |
| $SiO_2$ | SiN | Cr | SiN | Cr | Stainless steel |
| $SiO_2$ | $TiO_2$ | Ti | $TiO_2$ | Ti | Cr/stainless steel |
| $SiO_2$ | TZO | Ti | TZO | Ti | Cr/stainless steel |
| $SiO_2$ | ZSO5 | Ti | ZSO5 | Ti | Cr/stainless steel |
| $SiO_2$ | ZSO9 | Ti | ZSO9 | Ti | Cr/stainless steel |
| $SiO_2$ | SiN | Ta | SiN | Ta | Cr/stainless steel |
| $SiO_2$ | SiN | Ta | SiN | Ti | Cr/stainless steel |
| $SiO_2$ | SiN | Ti | SiN | Ta | Cr/stainless steel |

TABLE XVIII-continued

Examples of a stack of coatings of a glass substrate according to the invention.
The glass substrate consists of a sheet of clear glass not colored in the mass.
The presentation of the X/Y type indicates from the glass a first layer of
material X followed by a second layer of material Y.

| Coat improving the adhesion of diel. mat. | 1st transp. diel. coat. (geom. th.: 10 nm-120 nm) Stricto senso | Semi-transp. funct. coat. geo. th.: 1 nm-25 nm | 2nd transp. diel. coat. geo. th.: 40 nm-120 nm | Coat. providing opacity geo. th.: 90 nm-200 nm | Protect. coat. geo. th.: 20 nm-200 nm |
|---|---|---|---|---|---|
| — | AZO | Stainless steel | SiN | Ti | Cr/stainless steel |
| — | AZO | Stainless steel/Ti | SiN | Ti | Stainless steel |
| — | AZO | Pd/Ti | SiN | Ti | Cr/stainless steel |
| — | ZSO5 | Pd/Ti | SiN | Ti | Cr/stainless steel |

The chemical compounds appearing in the form of TZO, AZO, ZSO5, ZSO9 correspond for TZO to a mixed titanium and zirconium oxide, AZO to an aluminum-doped zinc oxide, ZSO5 to a mixed zinc and tin oxide comprising 50% by weight of zinc, ZSO9 to a mixed zinc and tin oxide comprising 90% by weight of zinc, the percentage weight of zinc is expressed in relation to the total weight of the metals present in the layer. The abbreviations 1st transp. diel. coat. improving the adhesion of diel. mat., 1st transp. diel. coat.—stricto senso, semi-transp. funct. coat., 2nd transp., diel. coat., coat. providing the opacity in geo. th., protect. coat. respectively mean first transparent dielectric coating, coating improving the adhesion made from dielectric material, first transparent dielectric coating—stricto senso, semi-transparent functional coating, second transparent dielectric coating, protective coating. The abbreviation "geom. th." means geometric thickness.

Table 19 shows an example of a glass substrate with interference coloration for a facing panel according to the invention. The glass substrate consists of a sheet of clear glass not colored in the mass.

TABLE XIX

| Coat improving the adhesion of diel. mat. (geom. th.: (nm)) | 1st transp. diel. coat. Stricto senso (geom. th.: (nm)) | Semi-transp. funct. coat. (geo. th.: (nm)) | 2nd transp. diel. coat. (geo. th.: (nm)) | Coat. providing opacity (geo. th.: (nm)) | Protect. coat. (geo. th.: (nm)) |
|---|---|---|---|---|---|
| SiO$_2$ (15 nm) | SiN (65 nm) | Ti (4 nm) | SiN (95 nm) | Ti (90 nm) | Type 304 stainless steel (150 nm) |

Table XX shows the conditions under which the successful depositions were made on a sheet of clear glass not colored in the mass and corresponding to the example resumed in Table XIX. These deposits were made by magnetron sputtering in a laboratory installation.

TABLE XX

| | Layer-geometric thickness (nm) | No. of passages * Conveyor speed (cm/min) | Power applied to the cathode (kW) | Ar (sccm) | N$_2$ (sccm) | O$_2$ (sccm) | P (Pa) |
|---|---|---|---|---|---|---|---|
| SiO$_2$ | 15 | 1 * 129.54 | 2.0 | 150.0 | 20.0 | 30.0 | 0.40 |
| SiN | 65 | 2 * 88.90 | 4.0 | 160.0 | 120.0 | — | 0.53 |
| Ti | 4 | 1 * 500.38 | 1.5 | 300.0 | — | — | 0.53 |
| SiN | 95 | 2 * 60.96 | 4.0 | 160.0 | 120.0 | — | 0.53 |
| Ti | 90 | 2 * 43.18 | 1.5 | 300.0 | — | — | 0.53 |

The example resumed in Table XIX meets standards ISO12543-4, ISO10545-13, ASTM G53-88 (UV 1000 hours) in terms of chemical behavior properties.

Table XXI shows the optical properties of the facing panel with interference coloration according to the invention presented in Table XIX after toughening, these properties are compared to those of a laminated glazing of the V50T type from AGC. The glass sheets constituting the double glazing and the facing panel with interference coloration according to the invention have the same chemical composition. The measurements were taken with a "SPETRASCAN" apparatus using a source corresponding to the CIE standard D65 "daylight" illuminant and at a solid angle of 10°.

TABLE XXI

| Measurement angle (°) | V50T Laminated Glazing | | | Facing panel with interference coloration presented in table XIX | | | |
|---|---|---|---|---|---|---|---|
| | L* | a* | b* | L* | a* | b* | ΔE*$_{v,\alpha}$ |
| 8.5 | 49.09 | −1.82 | −10.88 | 49.09 | −1.72 | −10.68 | 0.22 |
| 15.0 | 48.66 | −1.92 | −10.66 | 49.07 | −1.76 | −10.71 | 0.44 |
| 25.0 | 48.34 | −2.15 | −10.24 | 48.90 | −1.85 | −10.60 | 0.73 |
| 35.0 | 48.52 | −2.44 | −9.60 | 48.59 | −2.08 | −10.22 | 0.72 |
| 45.0 | 49.51 | −2.65 | −8.39 | 48.03 | −2.48 | −9.32 | 1.76 |
| 60.0 | 52.93 | −2.58 | −6.82 | 48.77 | −2.85 | −7.81 | 4.28 |

Table XXII shows examples of a glass substrate according to the invention which can be used as reflecting decorative panels, the geometric thicknesses given in brackets are expressed in nanometers.

TABLE XXII

| Ex | Coating improving the adhesion type/ thickness (nm) | First transparent dielectric coating type/ thickness (nm) | Semi- transparent functional coating type/ thickness (nm) | Second transparent dielectric coating type/ thickness (nm) | Coating providing the opacity type/ thickness (nm) |
|---|---|---|---|---|---|
| 37 | SiON/15.0 | SiN/67.1 | Stainless steel/1.94 | SiN/136.3 | Stainless steel/200.0 |
| 38 | SiON/15.0 | SiN/61.3 | Stainless steel/29.8 | SiN/96.8 | Stainless steel/200.0 |
| 39 | SiON/15.0 | SiN/57.8 | TiN/3.2 | SiN/123.1 | Stainless steel/200.0 |
| 40 | SiON/15.0 | SiN/64.5 | Stainless steel/3.6 | SiN/116.2 | Stainless steel/200.0 |
| 41 | SiON/15.0 | SiN/14.4 | Stainless steel/4.1 | SiN/89.0 | Stainless steel/200.0 |
| 42 | SiON/15.0 | ZnO/75.3 | Stainless steel/8.3 | ZnO/22.8 | Stainless steel/200.0 |

The oxidized stainless steel layer in example is obtained by magnetic field-assisted vacuum cathode sputter deposition from a stainless steel target under atmosphere mainly containing oxygen.

All the preceding examples in Table XXII are satisfactory in terms of behavior properties in the various tests described below:

CASS Test

The CASS test serves to obtain an indication of the corrosion resistance by subjecting the example to an accelerated salt mist corrosion test in the presence of copper-acetic acid solution. The test sample is placed in a chamber at 50° C. and is subjected to the action of a mist formed by spraying an aqueous solution containing 50 g/l of sodium chloride, 0.26 g/l of anhydrous copper chloride with sufficient glacial acetic acid to adjust the pH of the sprayed solution between 3.1 and 3.3. All the details of this test are described in international standard ISO 9227-1990. The samples can be subjected to the action of the salt mist for different time intervals, after which the reflectance properties of the artificially aged sample can be compared with the reflectance properties of the freshly formed sample. An exposure time of 120 hours is found to provide a useful indication of the resistance of the sample to aging. The CASS test is performed on square samples having an area of 100 cm$^2$ tiles and having freshly cut edges. After 120 hours of exposure to the mist based on acetic solution containing the copper salt, each tile is subjected to microscopic examination. The main visible evidence of corrosion is a darkening of the coating causing opacity or quasi-opacity and the peeling of the said coating on the periphery of the reflecting decorative panels. The scale of the corrosion is observed at five uniformly spaced locations on each of the two opposite edges of the sample and an arithmetic mean of the ten measurements is calculated. The maximum corrosion at the margin of the sample can also be measured in order to obtain a result, which is also measured in microns, preferably, the maximum corrosion is lower than 300µ, preferably lower than 250µ. In order to obtain good measurement representativity, the CASS test can be performed on ten samples and the arithmetic mean of the ten samples calculated from the arithmetic mean of each sample. Preferably, the samples have less than five white spots per dm$^2$ after the CASS test, preferably less than one white spot per dm$^2$.

Test in Water Bath and in Wet Chamber

Tests in water bath and in wet chamber are intended to test the resistance to and/or compatibility with adhesives. A drop of adhesive about 5 cm in diameter is placed on the back of a 10×10 cm sample, in other words, on the coating providing the opacity or quasi-opacity. The thickness of the adhesive is 2 mm, this thickness is obtained by using a 2 mm thick spacer. In the water bath test, the samples are placed in the water bath immediately after the adhesive is applied. The temperature of the water in the water bath is regulated at 35° C. A separate water bath is used for each family of adhesives. In the wet chamber test, the samples are placed in a wet chamber after 10 days of polymerization of the adhesive at ambient temperature and in ambient conditions. The wet chamber is regulated at a temperature of 40° C. The two tests have a duration of 20 days. The evaluation of the results of these tests is classed under 4 headings:

Unacceptable: a modification of the "Haze" is observed when measured in daylight.

Limit of acceptable: a modification of "Haze" is observed when measured in a dark room in diffused light.

Acceptable: a modification of "Haze" is observed when measured in a dark room under a spotlight.

O.K.: no modification of "Haze" is observed.

The samples having obtained an evaluation "limit of acceptable", "acceptable" and "OK" are considered to have passed the test. It should be noted that the modification of the "Haze" may appear under the position of the adhesive or next to this position. The adhesives used in these tests are of the following type: oxime, alkoxy, MS polymer and rubber.

AWT Test

The adhesion of the stack of coatings to the substrate is measured using the AWRT test described above.

The invention claimed is:

1. A glass substrate, comprising a glass sheet and a stack of coatings covering a face of the glass sheet, wherein the stack of coatings comprises in succession from the glass sheet:
   a first transparent coating comprising a dielectric material with an optical thickness of 5.0 nm or more and 258.0 nm or less,
   a semi-transparent functional coating with a geometric thickness of 0.1 nm or more and 50.0 nm or less,
   a second transparent coating comprising a dielectric material with an optical thickness of 20.0 nm or more and 300.0 nm or less, and
   an opacifying coating, comprising a metal, metalloid, nitride, carbide, or any combination thereof, capable of providing opacity or quasi-opacity of the stack,
   wherein a geometric thickness of the opacifying coating is 50.0 nm or more, and
   the glass substrate has interference coloration and is suitable for a facing panel,
   wherein the first and second transparent coatings comprise at least one layer having a material selected from the group consisting of silicon oxides, mixed oxides of at least silicon and aluminum, silicon nitrides, aluminum nitrides, mixed nitrides of aluminum and silicon, silicon oxynitride, aluminum oxynitride, and mixed oxynitrides of silicon and aluminum,
   wherein the semi-transparent functional coating comprises at least one layer having a metal selected from the group consisting of titanium, tungsten, niobium, chromium, nickel, copper, tantalum, zirconium, yttrium, palladium, iron, and alloys or mixtures of at least two of these metals and stainless steels, and
   wherein the stack of coatings provides a visible light transmittance of at most 4%, when said stack is applied to a clear silica soda lime float glass 4 mm thick, measured with a source corresponding to the CIE standard D65 "daylight" illuminant and at a solid angle of 2°, according to standard EN410.

2. The glass substrate of claim 1,
wherein the semi-transparent functional coating is a metallic coating with a color attenuation thickness of 0.3 nm or more and 30.0 nm or less, and
the color attenuation thickness is a product of the geometric thickness of the functional coating multiplied by a complex part, k, of a refractive index at 550 nm of a metal in the semi-transparent functional coating.

3. The glass substrate of claim 1, wherein the semi-transparent functional coating and the opacifying coating are metallic coatings.

4. The glass substrate of claim 1, wherein the glass sheet consists of a clear silica soda lime glass.

5. The glass substrate of claim 1, further comprising:
a protective coating with a geometric thickness 5.0 nm or more above the opacifying coating.

6. The glass substrate of claim 5, wherein the protective coating comprises a layer comprising at least one material selected from the group consisting of carbon, chromium, nickel, aluminum, stainless steel, nickel-chromium metal alloy, NiCrAlY metal alloy, silicon oxides, silicon nitrides, and silicon oxynitrides.

7. The glass substrate of claim 1, further comprising:
a further coating comprising a transparent dielectric material, between the glass sheet and the first transparent coating,
wherein the further coating is configured to improve adhesion.

8. The glass substrate of claim 1, wherein the opacifying coating comprises a layer having a chemical composition of a layer of the semi-transparent functional coating.

9. The glass substrate of claim 7,
wherein the further coating comprises silicon oxynitride and has a geometric thickness of 0.0 nm or more and 50.0 nm or less,
the dielectric material of the first transparent coating is silicon nitride,
a geometric thickness of the first transparent coating is 10.0 nm or more and 129.0 nm or less,
the semi-transparent functional coating is a metallic functional coating with a color attenuation thickness of 0.3 nm or more and 30.0 nm or less,
the color attenuation thickness is a product of the geometric thickness of the functional coating multiplied by a complex part, k, of a refractive index at 550 nm of a metal in the semi-transparent functional coating,
the second transparent coating comprises, as a dielectric material, silicon nitride,
a geometric thickness of the second transparent coating is 10.0 nm or more and 150.0 nm or less, and
the opacifying coating is a metallic coating comprising a layer of stainless steel.

10. The glass substrate of claim 8,
wherein the first transparent coating comprises silicon nitride and has a geometric thickness of between 10.0 nm and 120.0 nm,
the semi-transparent functional coating is a metallic coating of titanium,
the geometric thickness of the semi-transparent functional coating is from 1.0 nm to 10.0 nm,
the second transparent coating comprises silicon nitride and has a geometric thickness of from 20.0 nm to 120.0 nm,
the opacifying coating comprises a first layer of titanium.

11. The glass substrate of claim 9,
wherein the semi-transparent functional coating comprises stainless steel,
the geometric thickness of the semi-transparent functional coating is from 0.1 nm to 10.0 nm, and
the geometric thickness of the opacifying coating is 50.0 nm or more and 1000.0 nm or less.

12. The glass substrate of claim 1, wherein the glass substrate is toughenable.

13. A facade, comprising:
an opaque zone comprising the glass substrate of claim 1, and a viewing zone comprising a laminated glazing,
wherein the glass substrate has the same color characteristics after toughening as those of the laminated glazing,
the glass substrate and the laminated glazing each comprise coatings on a glass sheet, and
the glass sheet of the glass substrate and the glass sheet of the laminated glazing have identical chemical composition.

14. A method for manufacturing the glass substrate of claim 1, the method comprising:
depositing the first transparent dielectric coating by magnetic field-assisted vacuum cathode sputtering,
depositing the semi-transparent functional coating by magnetic field-assisted vacuum cathode sputtering,
depositing the second transparent dielectric coating by magnetic field-assisted vacuum cathode sputtering, and
depositing the opacifying coating by magnetic field-assisted vacuum cathode sputtering.

15. A facade facing panel comprising the glass substrate of claim 1.

16. The glass substrate of claim 11, wherein the layer of stainless steel in the opacifying coating is a first layer in the opacifying coating.

17. The glass substrate of claim 11, wherein the geometric thickness of the opacifying coating is 100.0 nm or more and 200.0 nm or less.

18. The glass substrate of claim 1, wherein the stack of coatings provides a visible light transmittance of at most 1%, when said stack is applied to a clear silica soda lime float glass 4 mm thick, measured with a source corresponding to the CIE standard D65 "daylight" illuminant and at a solid angle of 2°, according to standard EN410.

19. A glass substrate, comprising a glass sheet and a stack of coatings covering a face of the glass sheet, wherein the stack of coatings comprises in succession from the glass sheet:
a first transparent coating comprising a dielectric material with an optical thickness of 5.0 nm or more and 258.0 nm or less,
a semi-transparent functional coating with a geometric thickness of 0.1 nm or more and 50.0 nm or less,
a second transparent coating comprising a dielectric material with an optical thickness of 20.0 nm or more and 300.0 nm or less, and
an opacifying coating, comprising a metal, metalloid, nitride, carbide, or any combination thereof,
wherein a geometric thickness of the opacifying coating is 50.0 nm or more,
wherein the first and second transparent coatings comprise at least one layer having a material selected from the group consisting of silicon oxides, mixed oxides of at least silicon and aluminum, silicon nitrides, aluminum nitrides, mixed nitrides of aluminum and silicon, silicon oxynitride, aluminum oxynitride, and mixed oxynitrides of silicon and aluminum,
wherein the semi-transparent functional coating comprises at least one layer having a metal selected from the group consisting of titanium, tungsten, niobium, chromium, nickel, copper, tantalum, zirconium, yttrium, palladium, iron, and alloys or mixtures of at least two of these metals and stainless steels, and wherein the stack of coatings provides a visible light transmittance of at most 4%, when said stack is applied to a clear silica soda lime float glass 4 mm thick, measured with a source corresponding to the CIE standard D65 "daylight" illuminant and at a solid angle of 2°, according to standard EN410.

20. The glass substrate of claim 19, wherein the semi-transparent functional coating and the opacifying coating are metallic coatings.

* * * * *